US006119570A

United States Patent [19]

[11] Patent Number: 6,119,570

[45] Date of Patent: *Sep. 19, 2000

Okonski et al.

[54] PANEL CUTTING APPARATUS WITH UNIVERSAL DIE HOLDER

[75] Inventors: Frank Okonski, Harwood Heights; Edward Porento, Sr., Des Plaines, both of Ill.

[73] Assignee: Best Cutting Die Company, Skokie, Ill.

[ * ] Notice: This patent is subject to a terminal disclaimer.

[21] Appl. No.: 08/868,157

[22] Filed: Jun. 3, 1997

[51] Int. Cl.[7] .......................... B23D 25/12; B26D 7/26; B26F 1/44

[52] U.S. Cl. .................................. 83/522.15; 83/698.42; 83/100

[58] Field of Search .......................... 83/522.16, 522.17, 83/522.18, 522.15, 522.22, 522.23, 98, 100, 123, 128, 346, 698.42, 134, 136, 140, 143, 117, 118, 698.21, 653, 13

[56] References Cited

U.S. PATENT DOCUMENTS 3,848,495 11/1974 Youra ........................................ 83/128
4,020,724 5/1977 Quinlan ........................................ 83/346
4,823,659 4/1989 Falasconi ........................................ 83/100
5,178,051 1/1993 Smith et al. ........................................ 83/685
5,555,786 9/1996 Fuller ........................................ 83/663
5,570,620 11/1996 Okonski et al. ........................................ 83/152
5,697,277 12/1997 Okonski et al. ........................................ 83/522.15
5,701,789 12/1997 Okonski ........................................ 83/13
5,782,152 7/1998 Reis et al. ........................................ 83/22
5,782,156 7/1998 Collins ........................................ 83/331

*Primary Examiner*—M. Rachuba
*Assistant Examiner*—Stephen Choi
*Attorney, Agent, or Firm*—Sitrick & Sitrick

[57] ABSTRACT

A universal cutting assembly is provided for cutting a panel from an envelope blank or the like. The die holder can have either a magnetic or non-magnetic outer surface and a plurality of surface orifices therein radially communicating with corresponding feed tubes for individually and selectively supplying vacuum or air to the surface and into the vicinity of the envelope blank. A novel die plate locating system is also provided for use with the universal cutting assembly.

33 Claims, 21 Drawing Sheets

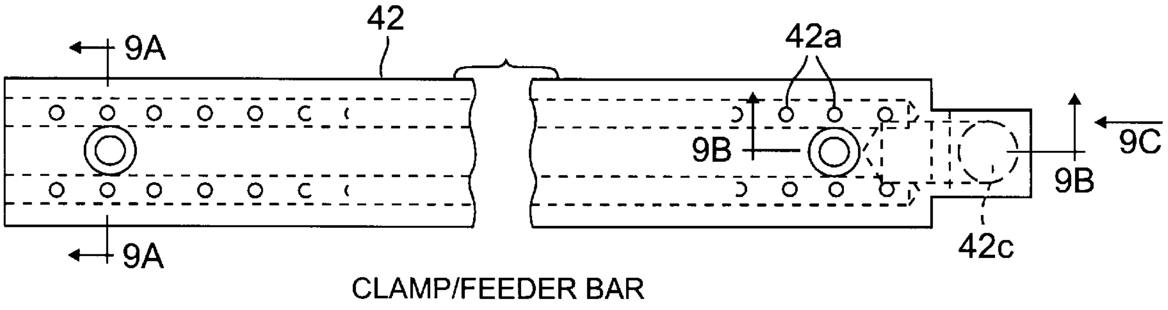
FIG. 9
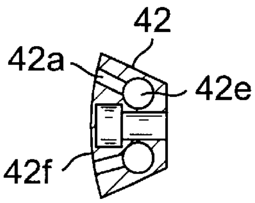
FIG. 9A
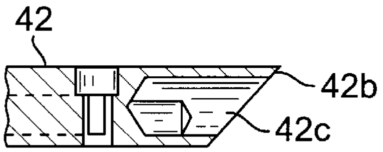
FIG. 9B
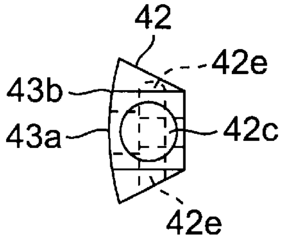
FIG. 9c
FIG. 10
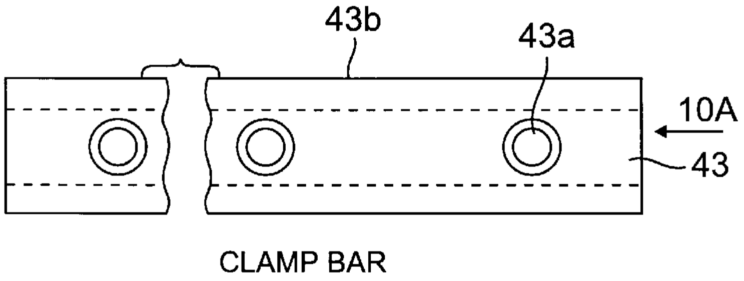
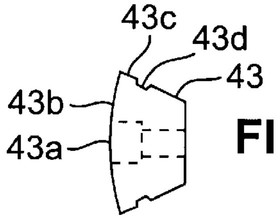
FIG. 10A

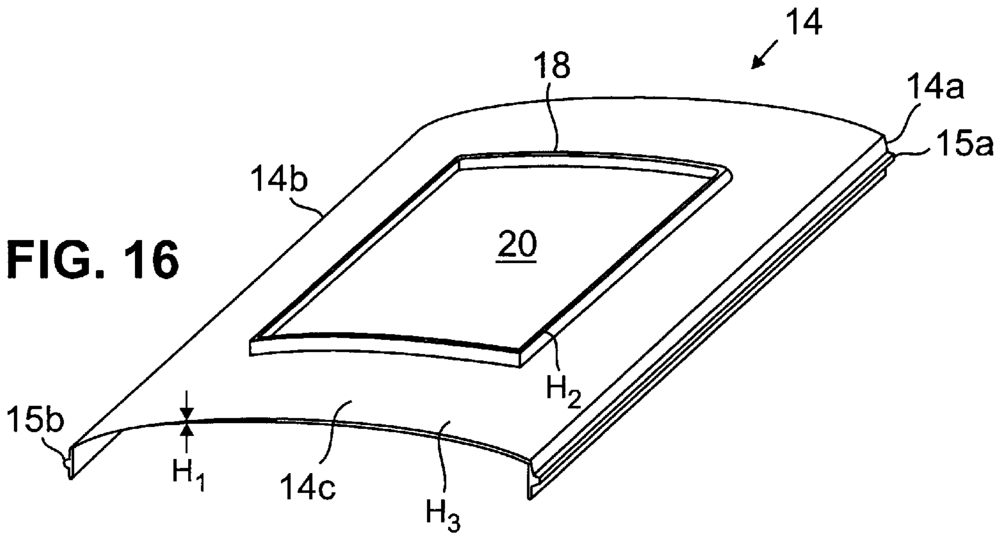
FIG. 16
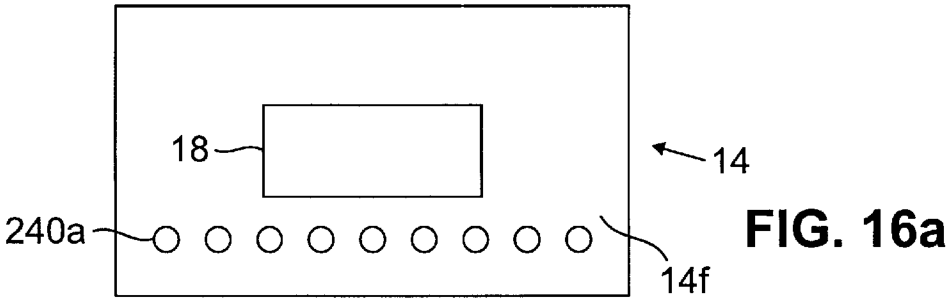
FIG. 16a
FIG. 16b
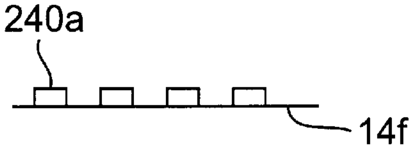
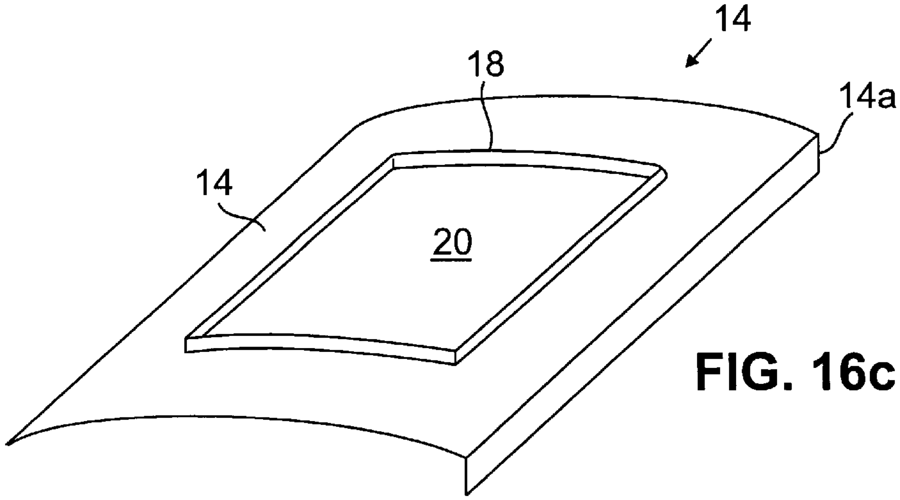
FIG. 16c

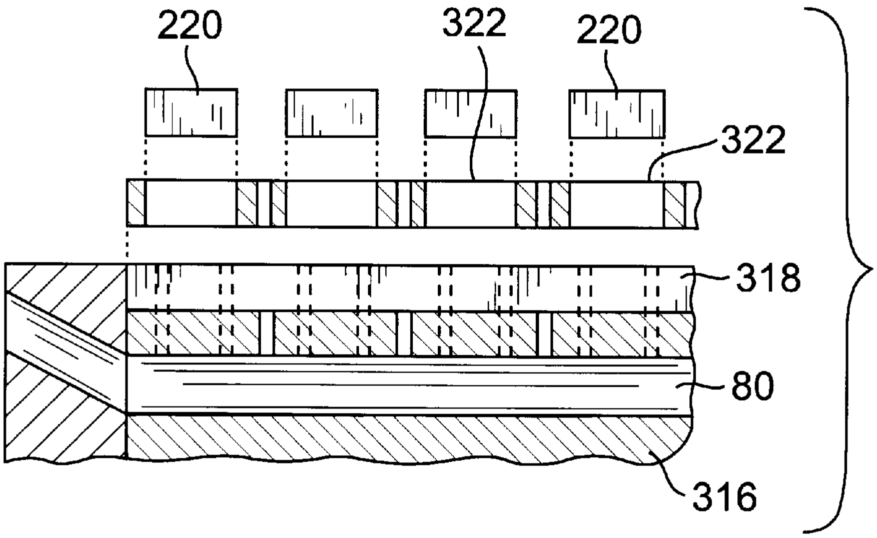
FIG. 27
FIG. 28
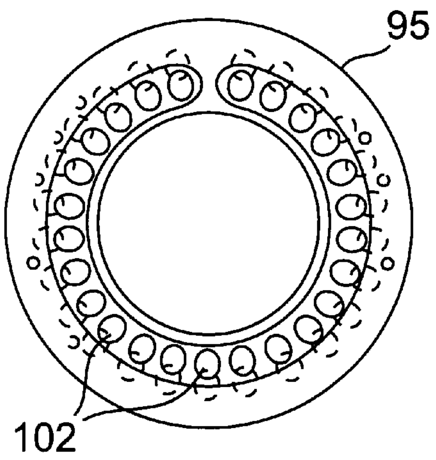
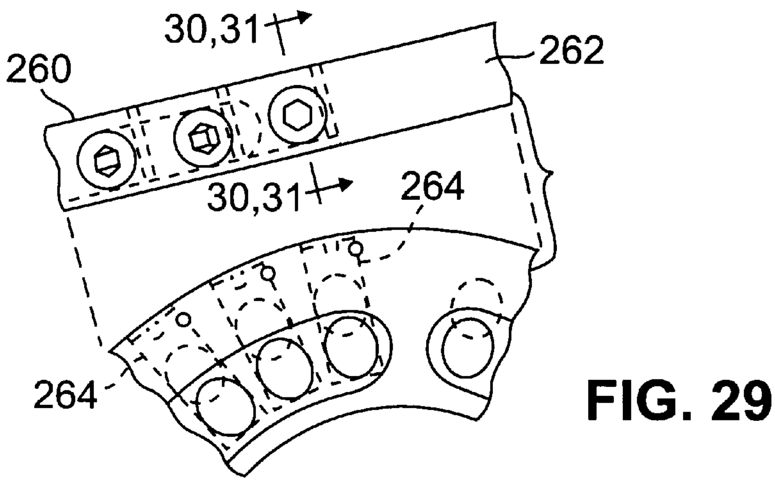
FIG. 29

PANEL CUTTING APPARATUS WITH UNIVERSAL DIE HOLDER

FIELD OF THE INVENTION

The present invention relates generally to a rotary cutting device, and more particularly, a universal die holding device for the cutting of windows, notches, orifices, or other patterns in relatively thin, flexible sheet-like material in either sheet or web form.

BACKGROUND OF THE INVENTION

Many envelopes have a transparent panel or window for allowing visual inspection of the enclosure. These window envelopes are manufactured from a web of paper material which is initially cut into blanks having a predetermined shape. A panel is subsequently cut from the blank by a panel cutting apparatus to form the window. Thereafter, the blank is then folded, gummed, printed, and packaged to form the finished envelope.

U.S. Pat. No. 4,823,659 to Falasconi describes a conventional rotary panel cutting apparatus comprising a cutting tool in the form of a cutting plate or die and a rotary die holder which brings the cutting die into successive contact with the envelope blanks which advance on a conveyor system. The cutting die has a raised cutting edge which is adapted to engage the blank and cut the panel.

The surface of the conventional die holder has a plurality of transport and vacuum orifices which communicate with corresponding air chambers which, in turn, selectively communicate with a source of vacuum or compressed air. The transport orifices are adapted to engage the envelope blank and, when the vacuum source is activated, carry the blank adjacent to the surface of the die holder. The rotation of the die holder carries the envelope to a cutting station where the blank is passed between the cutting die and a cutting bar so as to cut the panel in the envelope blank. The vacuum orifices are disposed within the periphery of the dies' cutting edges and, when the vacuum source is activated, form a localized vacuum zone within the vicinity of the cutting die to retain and carry away the panel which is cut from the envelope blanks. The envelope blank and the cut panel may be released from the die holder and the cutting die, respectively, by terminating the vacuum source or applying the compressed air to the transport and vacuum orifices. The vacuum and compressed air supply to each opening is controlled by means of valves or attachment tubes which are manually attached to each individual orifice. The attachment tubes typically rotate in unison with the die holder.

Unfortunately, the prior art panel cutting apparatuses suffer from numerous drawbacks. Since the die holder typically rotates from zero to about 1500 rpm, it is extremely difficult to obtain a proper seal between the rotating vacuum tubes and the feed tubes which permits the envelope blank to move, resulting in improper alignment between the cutting die and the envelope blank. Similarly, it is extremely difficult to obtain a proper seal at the vacuum orifices between the die holder and the drive shaft due to wear and abrasion, resulting in insufficient vacuum to carry the envelope blank and the panel and jamming of the cutting apparatus. It is also difficult to apply the vacuum or air at the correct time during the rotation of the die holder.

Another drawback is the lack of adjustability of the apparatus to cut out panels of different sizes as well as different locations on the blank. Attempts to provide an adjustable die holder capable of receiving different size cutting dies have been unsuccessful because the holding mechanisms, such as removable cover plates and holding keys, used to attach the cutting dies to the die holders leave significant areas without the vacuum orifices necessary to carry the envelope blank and the panel. In addition, these attempts have resulted in die holders which become unbalanced during rotation.

In order to minimize the assembly and disassembly downtime, magnetic clamp assemblies, having magnetic strips disposed in the surface of the die holder to magnetically attract and hold the cutting die, have been attempted. Unfortunately, the forces resulting from the rotation of the die holder may cause the cutting die to slide laterally on the surface of the magnets. To prevent the lateral movement of the cutting die, conventional magnetic die holders have also utilized complicated mechanical clamping assemblies to hold at least the leading end of the cutting die while the magnetic clamps hold the remaining portion of the cutting die. The conventional edge clamp suffers two drawbacks, either the leading edge must be clamped securely, and suffers a corresponding reduction in longevity, or one must refrain from creasing the leading edge, which in actual practice is extremely difficult. An example of this conventional practice is found in U.S. Pat. No. 5,555,786 to Fuller.

Further, with conventional rotary cutting apparatus, when such a die cuts patterns from material, such as windows out of paper envelopes, the scrap material cut, such as chips of paper, does not always completely disengage from the original material. Even if the scrap material did disengage from the original material, there was still a likelihood that the scrap material would be left on the cutting die plate near the edges of the pattern being cut. This residual scrap material, left on the original material, or on the cutting die plate, causes the cutting machinery to jam, resulting in down time, breakage of tooling, waste of material, and slowing down of machine operation to compensate for the residual scrap material buildup.

Finally, conventional die holders are severely limited as to possible placement positions of the die plate on the surface of the cylinder.

OBJECTS AND SUMMARY OF THE INVENTION

Accordingly, it is an object of the invention is to provide an improved cutting tool for cutting panels from blanks of sheet-like material.

A primary object of the invention is to provide an improved cutting die system for material retention and expulsion which is adaptable for orientation at a plethora of predetermined locations on the cutting tool surface.

Another object of the invention is to provide an improved die holder for a panel cutting tool.

It is a related object of the invention to provide a die holder which may be easily and readily adjusted to position the cutting die.

It is an object of the invention to provide a cutting tool having an improved distribution of air orifices.

A more specific object of the invention is to provide a cutting tool which maximizes the number and allows control of individual vacuum orifices disposed over the die holder surface.

Another object of the invention is to provide a die holder which prevents the cutting die from moving laterally on the die holder surface with no stress on the cutting die leading or trailing ends.

A rotary cutting assembly is therefore provided for cutting a panel from an envelope blank or the like. The cutting assembly comprises a cutting die mounted on a die holder adapted to be mounted on a drive shaft for rotating about an axis. The die holder has a plurality of surface orifices radially communicating with corresponding longitudinally directed feed tubes for supplying vacuum or air to the surface and into the vicinity of the envelope blank.

In accordance with one aspect of the invention, a novel air delivery assembly is provided for delivering vacuum and/or air to the die holder. The air delivery assembly comprises a stationary plate disposed at least at one end of the die holder and defining a groove member for selectively supplying vacuum and/or air so that a supply of vacuum or air is selectively supplied at the surface orifices of the die holder when rotation of the die holder aligns the longitudinal feed tubes with the groove member.

In one embodiment, the air delivery assembly comprises a transport assembly and a vacuum assembly disposed on opposing sides of the die holder. The transport assembly is adapted to feed vacuum to the die holder in order to retain the envelope blank adjacent to the die holder and "transport" the envelope blank as the holder rotates through the cutting operation. The vacuum assembly, in turn, is adapted to feed vacuum to the die holder in order to retain the panel cut from the envelope blank adjacent to the die holder until a predetermined position is reached wherein the panel is released from the die holder. At predetermined positions, the transport and vacuum assemblies may feed compressed air to the die holder in order to release the envelope blank and the panel, respectively.

In accordance with certain objects of the invention, the die holder can have one or more grooves for receiving a holding key which cooperate to clamp one of the edges of the cutting die therebetween for securing the cutting die to the holder. In one embodiment, the holding key may have a plurality of orifices for supplying vacuum or air to the surface of the key and at least one longitudinally directed feed tube which radially communicates with the orifices for supplying vacuum and/or air to the orifices. In another embodiment, a transport key is provided which is adapted to engage and retain the leading edge of the envelope blank adjacent to the outer surface of the key as the die holder rotates. A feeder key is also provided which is adapted to engage and retain the envelope blank or the panel cut from the blank adjacent to the outer surface of the key as the die holder rotates.

In accordance with certain objects of the invention, the die holder may have a removable cover plate having a plurality of orifices disposed on the plate surface and feed tubes subjacent the plate surface which communicate with the orifices for supplying vacuum or air to the orifices. In one embodiment, the feed tube extends in the longitudinal direction so as to communicate with both ends of the cover plate. In another embodiment, the feed tube only communicates with one end.

The operator may select whether individual feed tubes (and the corresponding orifices) communicate with either the transport assembly or the vacuum assembly. In applications where the envelope blank is adjacent to the certain predetermined orifices and it is desired to retain the envelope blank adjacent the die holder, the feed tubes corresponding to the predetermined orifices communicate with the transport assembly. Conversely, if the panel is adjacent to the predetermined orifices, the feed tubes corresponding to the predetermined orifices communicate with the vacuum assembly.

In accordance with certain objects of the invention, a magnetic die holder has an outer surface having a slot extending along the longitudinal axis for detachably receiving the leading end of the cutting die and a plurality of magnetic members disposed in the die holder surface for attracting the cutting die. In a preferred embodiment, the die holder may have a plurality of orifices disposed between adjacent magnetic members for delivering vacuum or air to the die holder surface. In order to maximize the number of orifices while minimizing the number of magnetic members, it is preferred that the magnetic members be disposed in a plurality of rows wherein each row contains alternating magnets and orifices and a row of orifices are disposed between each adjacent row of magnets.

Further, the present invention provides a novel system for locating a cutting die plate anywhere on the cutting die, whether the die holder is magnetic or non-magnetic.

Lastly, the cutting die system includes on the side of the die contacting the cylinder, formed pucks that fit into any of the air holes on the magnetic surface of the magnetic die holder, thereby aiding in the positioning and retention of the die plate.

These and other aspects and attributes of the present invention will be discussed with reference to the following drawings and accompanying specification.

BRIEF DESCRIPTION OF THE DRAWINGS

FIG. 9 is a top view of clamp/feeder bar;

FIG. 9A is a view of the clamp/feeder bar taken along line A—A in FIG. 9;

FIG. 9B is a view of the clamp/feeder bar taken along line B—B in FIG. 9;

FIG. 9C is a view of the clamp/feeder bar taken along C—C in FIG. 9;

FIG. 10 is a top view of the clamp bar;

FIG. 10A is a view of the clamping bar taken along line A—A in FIG. 10;

FIG. 16 is a perspective view of a cutting die;

FIG. 16A is a bottom view of the cutting die of FIG. 16 showing the locator puck of the invention;

FIG. 16B is an end view of the cutting die of FIG. 16A showing the locator puck of the invention;

FIG. 16C is a view of an alternate embodiment of the cutting die of FIG. 16;

FIG. 27 is an exploded view of the magnetic die holder taken along line 27—27 in FIG. 26;

FIG. 28 is an elevational view of an end plate having a valve assembly in accordance with the present invention;

FIG. 29 is an enlarged view of the end plate and valve assembly shown in FIG. 28;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention as set forth in the following specification.

DETAILED DESCRIPTION OF THE PREFERRED EMBODIMENT

Figure 1:
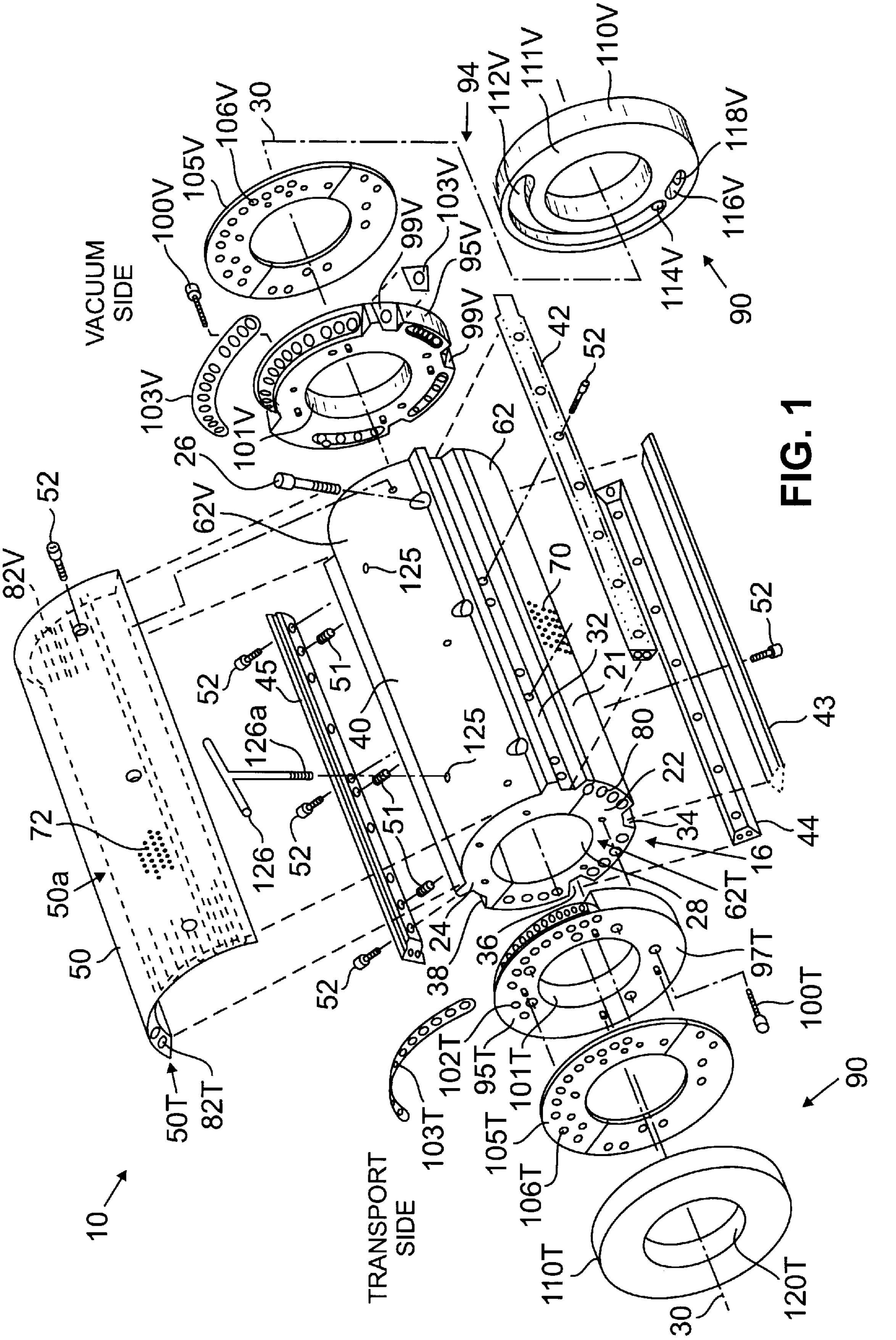
FIG. 1 is an exploded view of a rotary cutter assembly in accordance with the present invention.
Figure 2:
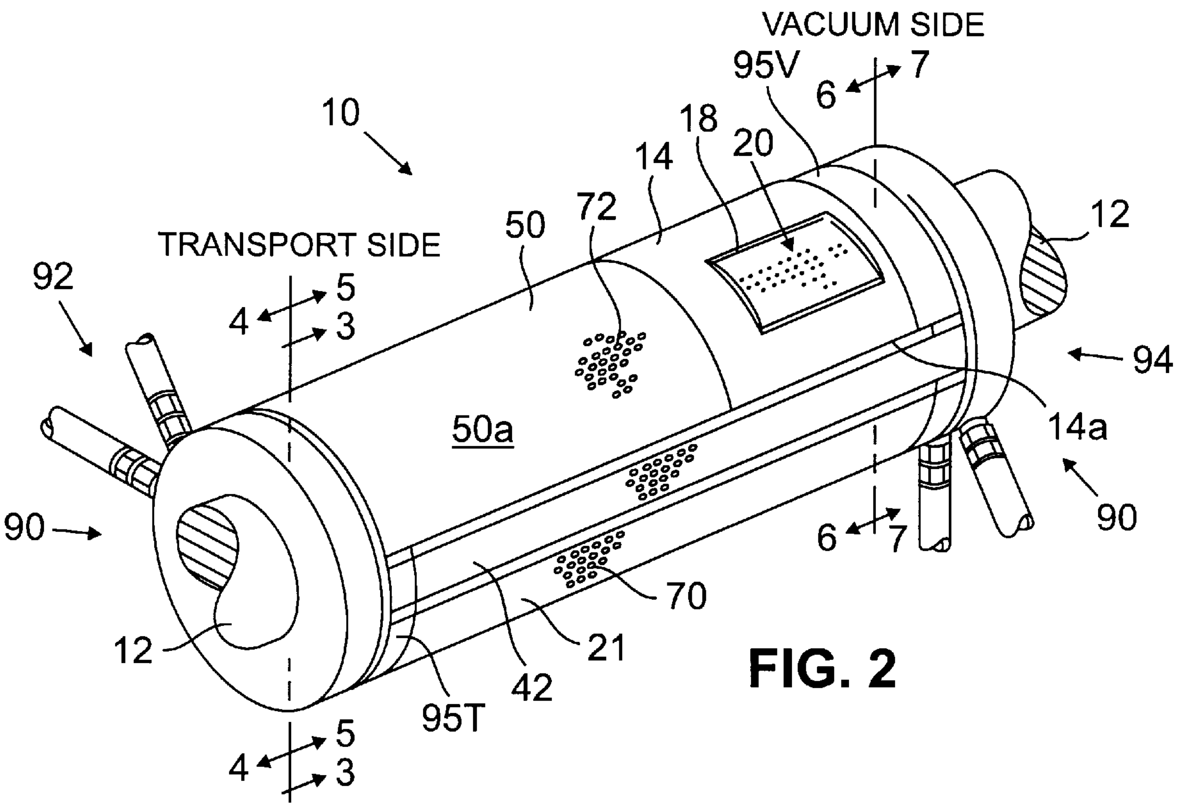
FIG. 2 is a perspective view of the assembled rotary cutter shown in FIG. 1.

Referring to the drawings and more particularly to FIGS. 1–2, one embodiment of a magnetic rotary cutting tool 10 for cutting panels P and the like from sheet-like material such as envelopes and the like is mounted on a drive shaft 12 in accordance with the present invention. The cutting tool 10 comprises a cutting die 14 mounted on a die holder 16. The drive shaft 12 rotates the die holder 16 so that the cutting die 14 engages a different envelope blank B for each rotation of the die holder 16.

The die holder 16 cooperates with an air delivery assembly in order to receive and retain the envelope blank B during the cutting operation. One embodiment of an air delivery assembly in accordance with certain objects of the invention is generally referenced as so although conventional air delivery assemblies may also be used. The die holder 16 has a transport side which is generally depicted as the left side in FIGS. 1 and 2 and a vacuum side which is generally depicted as the right side. The transport side of the die holder 16 is adapted to receive vacuum or compressed air from the air delivery assembly 90 in order to retain and transport the envelope blank B as the die holder 16 rotates through the cutting operation. The vacuum side, in turn, is adapted to receive vacuum or compressed air from the air delivery assembly 90 in order to retain and carry the panel P cut from the envelope blank B adjacent to the die holder 16 until a predetermined position is reached wherein the panel P is released from the die holder 16. The suffix "t" and "v" will be used to denote the transport and vacuum sides, respectively, of the die holder 16. The structure and operation of the rotary cutting tool 10 is explained in greater detail below.

THE CUTTING DIE PLATE

Figure 3:
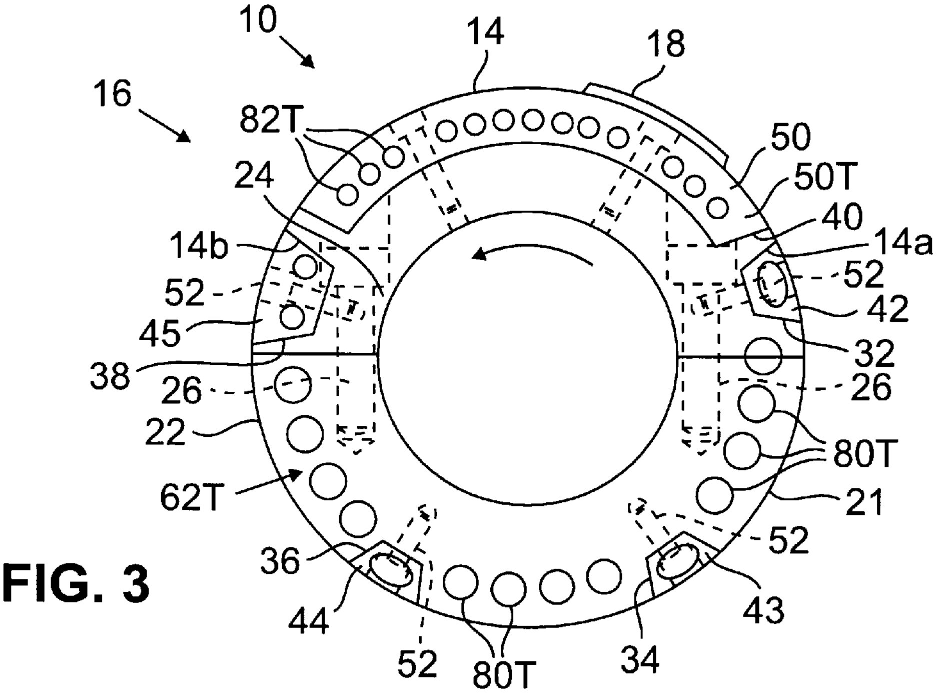
FIG. 3 is a sectional view of the transport face of the die holder taken along line 3—3 in FIG. 2.
Figure 4:
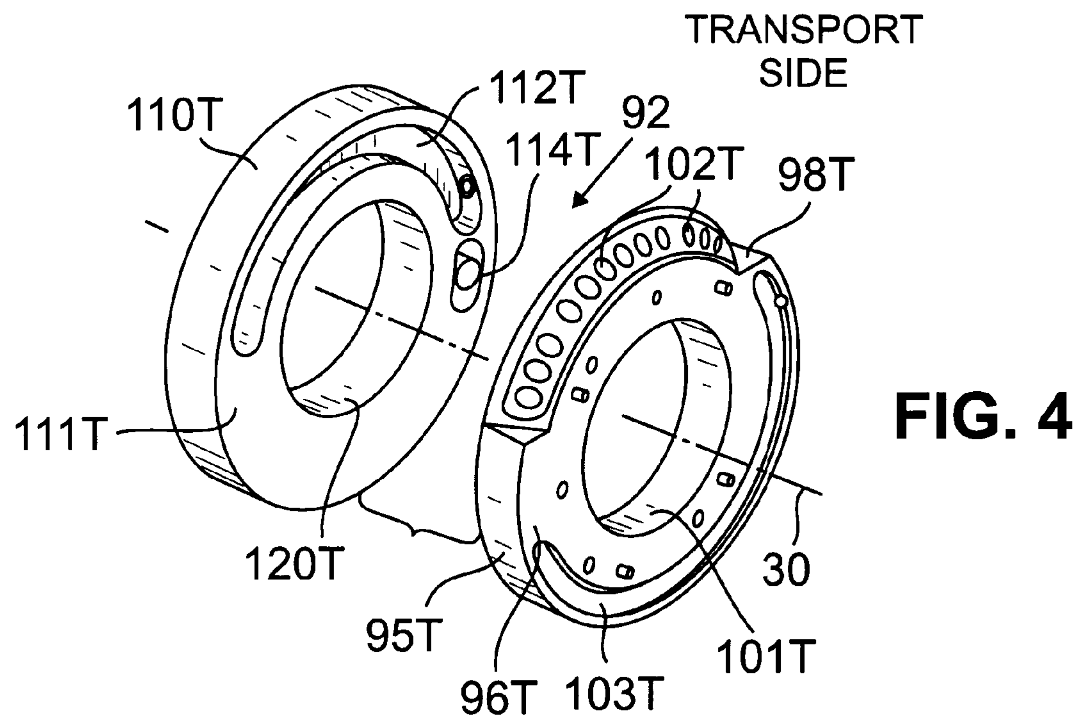
FIG. 4 is an exploded view of the connector die and the stationary plate (transport side) taken along line 44 in FIG. 2.
Figure 16D:
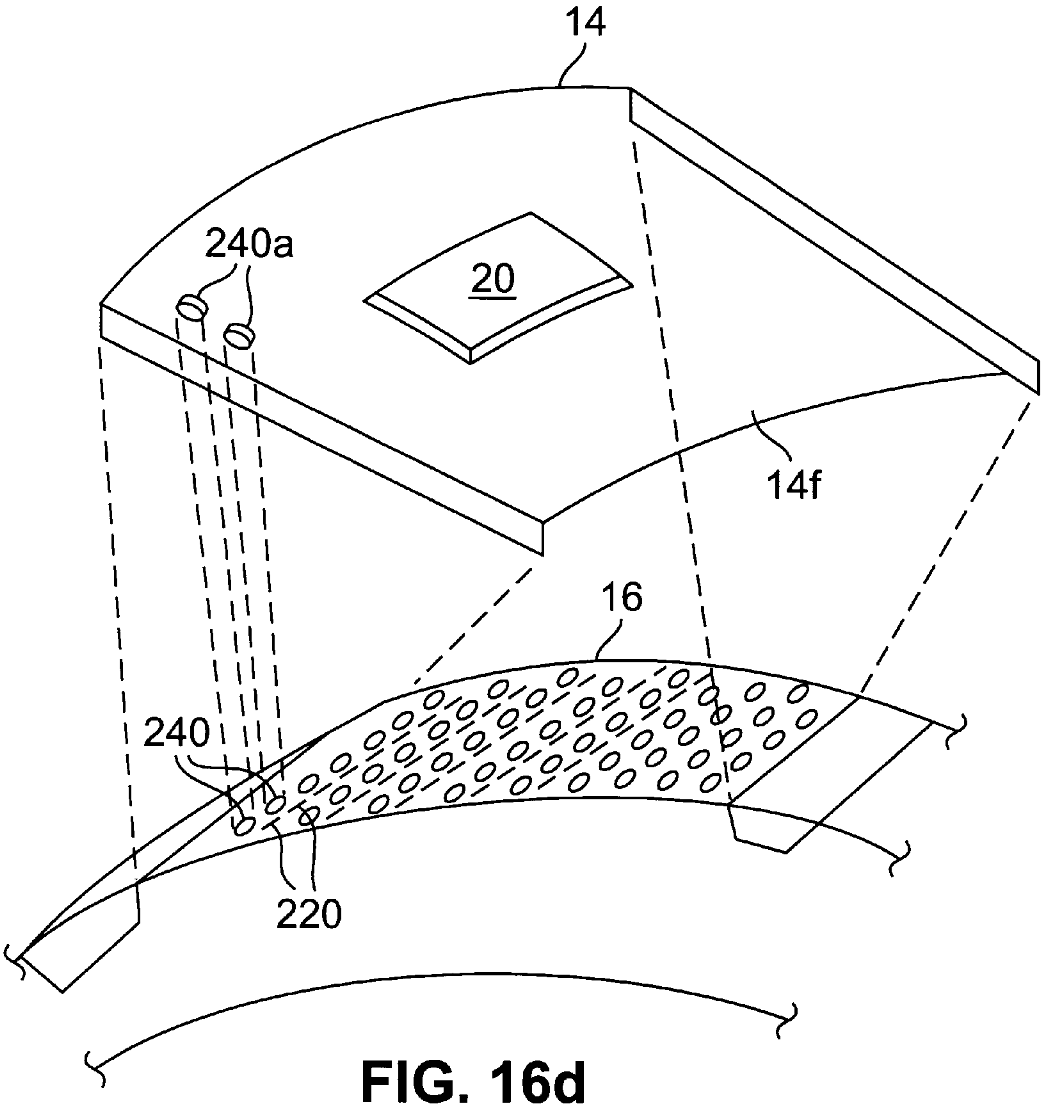
FIG. 16D is an exploded perspective view of an alternate embodiment of the cutting die of FIG. 16.
Figure 16E:
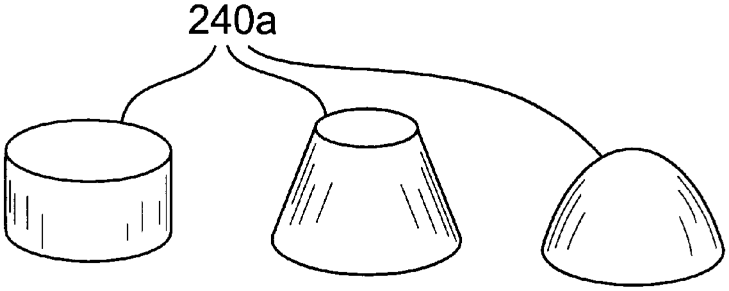
FIG. 16E illustrates example geometric varieties of the locator pucks of FIGS. 16B and 16D.
Figure 17:
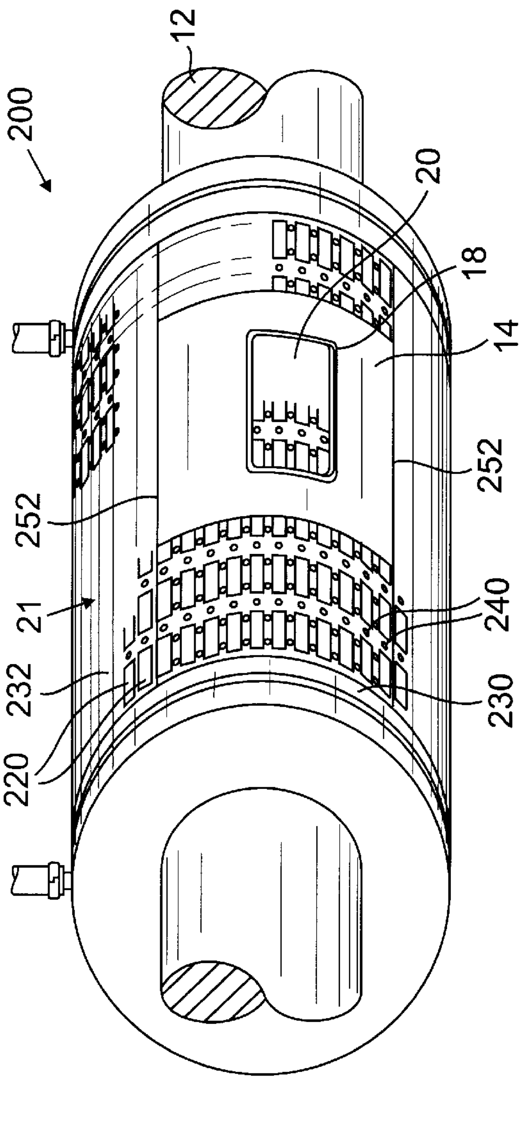
FIG. 17 is a perspective view of a magnetic rotary cutter assembly in a accordance with the present invention.
Figure 18:
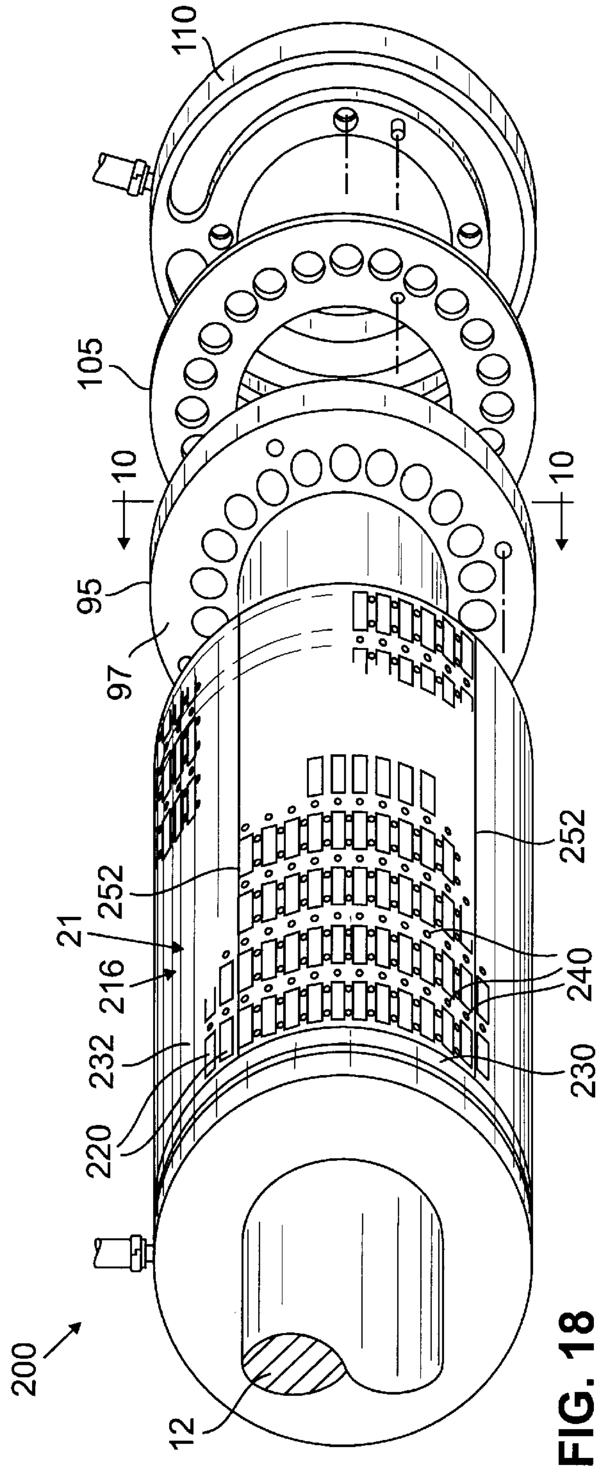
FIG. 18 is an exploded view of the rotary cutter assembly shown in FIG. 17.
Figure 19:
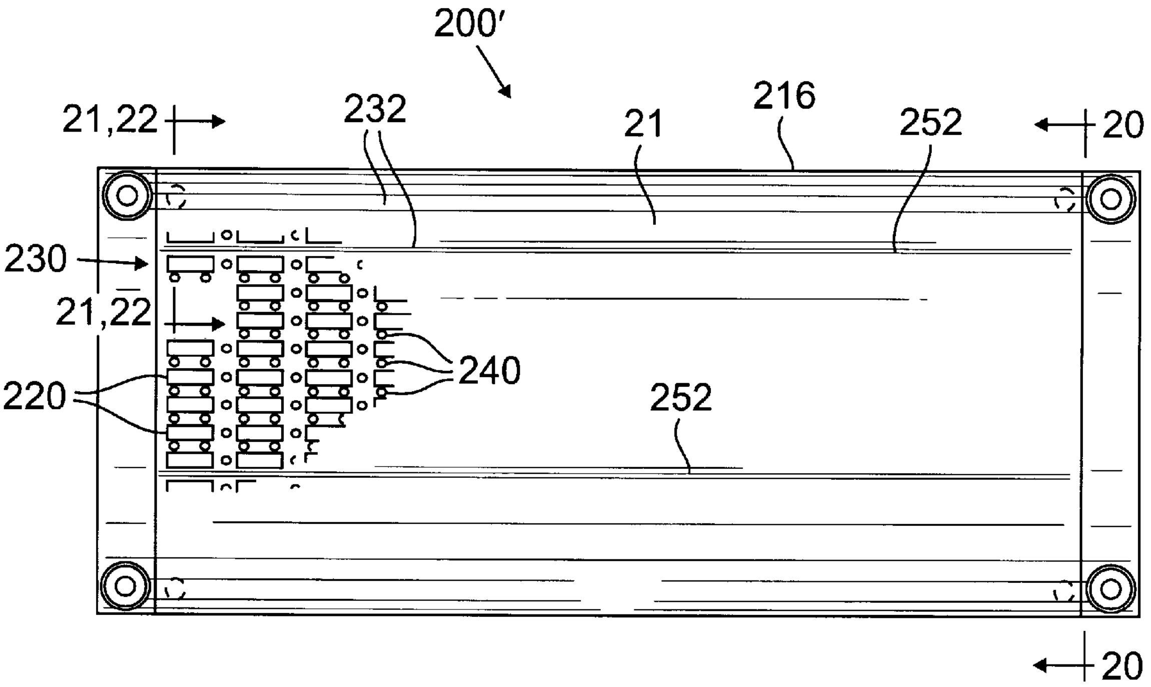
FIG. 19 is an elevational view of the magnetic die holder.

As shown in FIGS. 2, 3 and 16, the cutting die 14 has two opposing sides 14*a*, 14*b* for selectively and releasably attaching to the die holder 16. Each side 14*a*, 14*b* has a corresponding lip 15*a*, 15*b*. The cutting die 14 has a raised cutting edge 18 having a contour corresponding to the outline of the panel P to be cut in the envelope blank B or web. Although any other appropriate shapes may be used, the cutting edge 18, in the illustrated embodiment, has a rectangular contour to cut a rectangular panel P from the blank B.

The cutting die plate 14 may be manufactured from any suitable flexible magnetically compatible material including, for example, stainless steel, carbon steel or the like.

The cutting die 14 also includes a central opening 20 which is defined by the cutting edge 18. The cutting die opening 20 permits the die holder 16 and the air delivery assembly 90 to communicate with the envelope blank B through the cutting die 14 so that the die holder 16 may feed vacuum into the vicinity of the cutting edges 18 to retain the panel P in the cutting die 14 and to carry the panel P away from the blank B. Similarly, the opening 20 permits the die holder and the air delivery assembly 90 to feed compressed air into the vicinity of the cutting edges 18 so as to release the panel P from the cutting die 14 at an appropriate time.

Referring to FIG. 16, the thickness H1 of the plate at surface 14*c* will typically be from about 0.003–0.060 inches, but may vary depending upon the application. The height H2 at the pattern surface 50 above the surface of the cutting die plate 14 will typically be about 0.003–0.033 inches. Height H3 of the push pattern projections 14*d* is less than height H2. Other types of cutting die impression plates having different pattern surfaces may have different dimensions H1 and H2, depending upon the application.

As shown in FIG. 16C, cutting die 14 may take the form of having only one side 14*a* for selectively and releasably attaching to the die holder 16. This embodiment would be used where only one holding key (described in detail below) would be used to hold the cutting die 14 to the rotary die holder 16.

FIG. 16B shows another embodiment of the cutting die 14 of the invention where on the under surface 14*f* of the cutting die 14, one or more puck locators 240*a* are formed. As hereinafter described and shown in FIGS. 33, the cutting die 1400 can be positioned anywhere desired on the surface of cutting die holder 1600.

THE DIE HOLDER

The rotary die holder 16 is adapted for holding the cutting die 14 in selected positions around its outer surface 21. As best shown in FIG. 1, the die holder 16 is formed by two semi-cylindrical sections 22 and 24 which are attached to each other by bolts 26 so as to define a cylindrical shape and a central bore 28 adapted to receive the drive shaft 12. The die holder 16 has a longitudinal axis 30 generally extending along the axis of the drive shaft 12. As best shown in the FIG. 3, the illustrated die holder 16 is adapted to rotate in a counter clockwise direction as shown by the arrow. The die holder 16 can utilize magnetic and, if desired, one or more non-magnetic members disposed about the outer surface, for retaining the cutting die 14 as hereinbelow described in detail.

Referring to FIGS. 1 and 3, the two sections 22, 24 can have up to four grooves 32, 34, 36, 38 and one larger channel 40 extending along the axis 30. Each groove 32, 34, 36, 38 is adapted to receive a holding key which, in the figures, are designated as 42, 43, 44, 45, respectively. The channel 40 is adapted to receive an arcuate cover plate 50. In order to ease disassembly of the key 45 from the die holder 16, the key 45 may be biased by coiled springs 51 compressed between the key 45 and the groove 38 to eject the key 45 from the groove 38 when the screws 52 are released. The other keys 42, 43, 44 and the cover plate 50 may also have similarly biased springs (not shown). When the keys 42, 43, 44, 45 and the cover plate 50 are attached to the two sections 22, 24 using screws 52, a substantially continuous, even and curved outer surface 21 is formed for receiving the die plate 14.

Each key 42, 43, 44, 45 is adapted to cooperate with its corresponding groove 32, 34, 36, 38 to clamp one of the edges 14*a* or 14*b* of the cutting die 14 therebetween. One or more keys may be used to selectively mount different size cutting dies 14 to the die holder 16 depending upon the predetermined size and location of the panel P to be cut from the envelope blank B. It should be understood that if desired, only one key can be utilized to clamp the one edges 14*a*, 14*b*, of the die. The remainder of the die 14 would in such a case be held by magnetic attraction to the die holder 16.

In the embodiment illustrated in FIGS. 2–3, for example, a relatively small cutting die 14 for cutting a small panel P is mounted to the die holder 16. The illustrated cutting die 14 is sized so that the two opposing edges 14*a*, 14*b* are clamped between the first and fourth keys 42, 45 and the cutting edge 18 extends over the outer surface 50*a* of the cover plate 50. The keys 43, 44 which are not used in the clamping process must be installed in grooves 34, 36 to provide a substantially even surface 21 for receiving the envelope blank B and to keep the die holder 16 properly weighted and balanced during rotation. If the panel P to be cut is not located entirely on the cover plate 50, another cutting die (not shown) of intermediate length may be used. In such applications, a different size die 14 may be clamped to any of the keys so that the cutting edge 18 is properly positioned along the periphery of the die holder 16 to the cut the panel P. It should be understood that the die holder 16 may be embodied having only one key in the first instance, as hereinabove described. In such a case, there would, of course, be no other keys to account for in operation.

In order to retain the envelope blank B and the panel P adjacent to the surface 21 of the die holder 16 during the cutting operation, the die holder 16 is capable of feeding vacuum from the air delivery assembly 90 to the outer surface 21 and into the vicinity of the adjacent envelope blank B and panel P. Referring to FIG. 3, it will be seen that the outer surface 21 of the die holder 16 which engages the envelope blank B is generally defined by the exterior surfaces of (1) the cover plate 50, (2) the keys 42, 43, 44, 45 and (3) the two cylindrical sections 22, 24.

THE CYLINDRICAL BODY

Turning first to the two cylindrical sections 22, 24, it will be seen in FIGS. 1 and 2 that exterior surface of the two sections 22, 24 which engage the envelope blank B have a plurality of orifices 70 disposed thereon which radially communicate with a plurality of corresponding feed tubes 80 subjacent the surface 21 of the die holder 16. Each feed tube 80 is generally parallel to the longitudinal axis 30 of the die holder 16 and have openings 80*t* and 80*v* in the transport and vacuum sides 62*t*, 62*v* of the die holder 16. A sealing gasket may be disposed between the section 22, 24 to provide an airtight seal.

Each feed tube 80 is adapted to communicate with the air delivery assembly 90 so that vacuum may be supplied to the feed tubes 80 so as to create a vacuum in the corresponding orifices 70 and retain the envelope blank B or panel P adjacent to the surface 21 of the corresponding orifices 70. Conversely, supplying compressed air to the feed tubes 80 will blow air through the corresponding orifices 70 and release the envelope blank B or panel P.

By selectively sealing the proper side of the feed tube 80, the operator may select whether the individual feed tube 80 (and the corresponding orifices 70) communicates with either the transport or the vacuum side of the air delivery assembly 90. In applications where the envelope blank B is adjacent to the certain predetermined orifices 70 and it is desired to retain the envelope blank adjacent the die holder 16, the transport side 80*t* of the feed tubes 80 corresponding to the predetermined orifices 70 are left open so that the feed tubes 80 communicate with the transport side of the air delivery assembly 90 whereas the vacuum side 80*v* is sealed. Conversely, if the panel P is adjacent to the predetermined orifices 70, the vacuum side 80*v* of the feed tubes 80 corresponding to the predetermined orifices 70 are left open so that the feed tubes 80 communicate with the vacuum side of the air delivery assembly 90 whereas the transport side 80*t* are sealed.

As best seen in FIG. 3, it is preferable that the walls defining the feed tubes 80 are separate from the drive shaft 12 so that any abrasion or other wear to the drive shaft 12 or the central bore 28 will not affect the vacuum seal in the feed tubes 80. Similarly, an insufficient seal in one of the feed tubes 80 will not affect the other separate feed tubes 80.

THE COVER PLATE

In order to retain an envelope blank B adjacent the outer surface 50*a* of the cover plate 50, the cover plate 50 also has a plurality of orifices 72 disposed about its entire outer surface 50*a*. The orifices 72 communicate with a plurality of corresponding feed tubes 82 subjacent the outer surface 50*a* of the cover plate 50. Like the feed tubes 80 in the two cylindrical sections 22 and 24 of the die holder 16, the cover plate feed tubes 82 extend generally along the axis 30 of the die holder 16 and are adapted to feed vacuum or compressed air from the air delivery assembly 90 to the air orifices 72 and into the vicinity of the envelope blank B.

In the embodiment of the cover plate 50 best illustrated in FIGS. 1, 5, 6 and 15, the feed tubes 82 extend through the entire length of the cover plate and open to both the transport face 50*t* and the vacuum face 50*v* of the cover plate 50 so that the opposing openings 82*t*, 82*v* of the feed tube 82 communicate with the transport and vacuum sides.

As with the feed tubes 80 in the cylindrical sections 22 and 24, the operator may select whether the individual feed tube 82 (and the corresponding orifices 72) communicate with either the transport or the vacuum side of the air delivery assembly 90 by selectively sealing one side of the feed tube 82. Referring to FIGS. 2 and 3 for illustrative purposes only, there is shown a cutting die 14 disposed over the cover plate 50. The operator may utilize a portion of the cover plate orifices 72 to control the retention of the panel P and the remaining orifices to independently control the retention of the envelope blank B. After preselecting the specific orifices 72 and the feed tubes 82 which communicate with the cutting die opening 20 (and the panel P), the operator may seal the transport side 82*t* of these feed tubes 82 so that only the vacuum side of the air delivery assembly 90 (which controls the retention of the panel P) communicates with the orifices 72. However, for the remaining orifices and feed tubes 82 which do not communicate with the cutting die opening 20 and the panel P, the vacuum side 82*t* of the feed tubes 82 are sealed so that the transport side of the air delivery assembly 90 (which controls the retention of the envelope blank B) communicates with the orifices 72 and envelope blank B adjacent thereto. Thus, it will be appreciated that a portion of the cover plate orifices 72 are utilized to control the panel P and the remaining orifices 72 are utilized to control the envelope blank B.

In applications where the cutting die 14 is not disposed over the cover plate 50, the vacuum side 82*v* of the feed tubes 82 are sealed whereas the transport side 82*t* are left open because the cover plate 50 is only utilized to transport the envelope blank B. It should now be appreciated that at least one side of each feed tube 82 must be covered to prevent the transport and vacuum sides of the air delivery assembly 90 from simultaneously communicating with the same feed tube 82.

Figure 13:
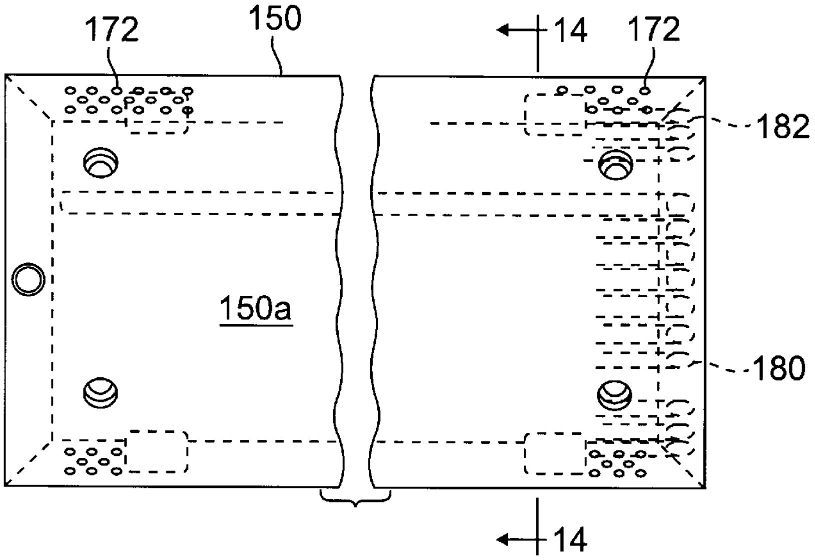
FIG. 13 is a top view of the embodiment of the cover plate illustrated in FIGS. 1–12.
Figure 14:
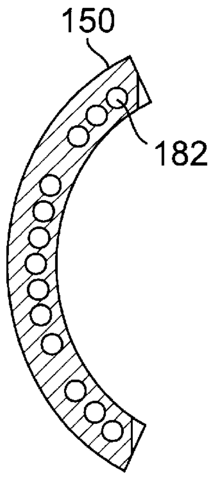
FIG. 14 is a sectional view of the cover plate taken along line 14—14 in FIG. 13.
Figure 15:
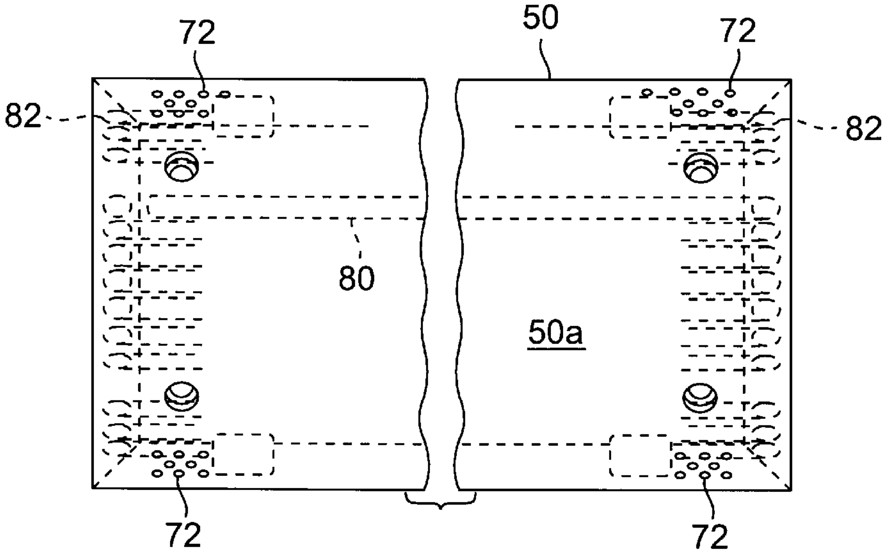
FIG. 15 is a top view of another embodiment of the cover plate.

In another embodiment of the cover plate 150 illustrated in FIGS. 13–14, the feed tubes 182 communicate with one side face of the cover plate 150. In applications where the cutting die 14 is disposed over the cover plate 150, the orifices 172 and feed tubes 182 which do not communicate with the die opening 20 and the associated panel P are sealed and the cover plate 150 is orientated so that the remaining open orifices 172 and feed tubes 182 communicate with the vacuum side of the air delivery assembly 90. Conversely, in applications where the cutting die 14 is not disposed over the cover plate 150, the orifices 172 and feed tubes 182 which communicate with the envelopes blank B are left open and the orientation of the cover plate 150 is reversed so that the feed tubes 182 communicate with the transport side of the air delivery assembly 90.

THE HOLDING KEYS

Three sample embodiments of the keys that can be used, if desired, to secure the cutting die 14 to the die holder 16 are illustrated in FIGS. 1–3, 5–6 and 8–10. It is desirable that the holding keys be adapted to be interchangeable with each other and to fit into any of the grooves 32, 34, 36, 38 so that the number of keys necessary for the operation of the die holder 16 are minimized, as only one key may be needed.

A conventional clamping bar 43 which is utilized to clamp the sides 14*a*, 14*b* of the cutting die to the die holder 16 is illustrated in FIG. 10. The clamping bar 43, which may be attached to the die holder 16 using screw holes 43*a*, is not adapted to feed vacuum or air to its outer surface 43*b*. In order to insure retention of cutting die between the clamping bar 43 and the corresponding groove, the side face 43*c* of each key preferably has a channel 43*d* disposed therein for receiving the lip 15*a*, 15*b* of the cutting die 14. It will be appreciated that the other holding keys 42, 44 and 45 may also have a channel to receive the die lip 15*a*, 15*b*.

Figure 8:
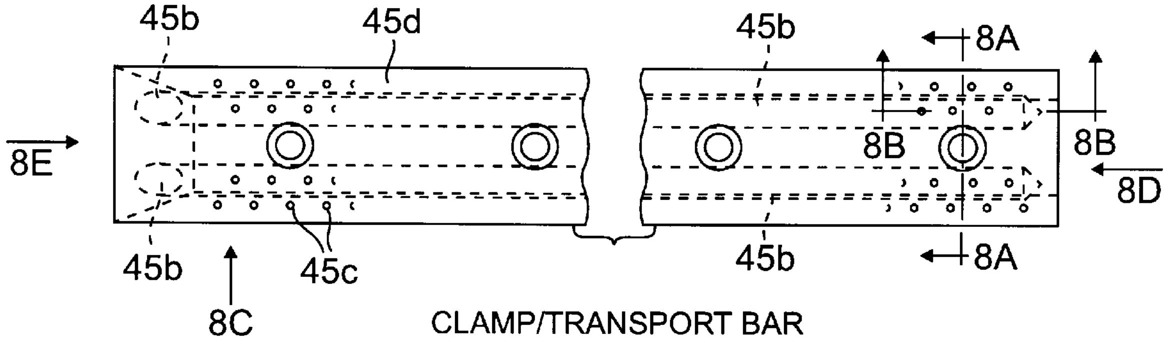
FIG. 8 is a top view of the clamp/transport bar.
Figure 8A:
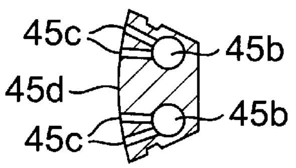
FIG. 8A is a view of the clamp/transport bar taken along line A—A in FIG. 8.
Figure 8B:
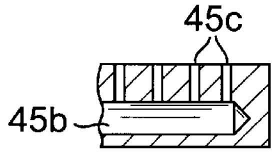
FIG. 8B is a view of the clamp/transport bar taken along line B—B in FIG. 8.
Figure 8C:
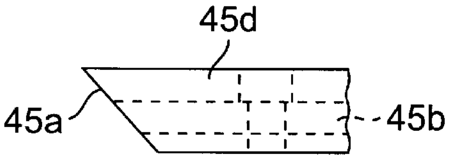
FIG. 8C is a view of the clamp/transport bar taken along line C—C in FIG. 8.
Figure 8D:
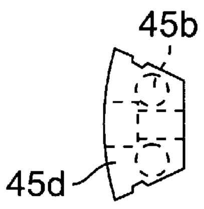
FIG. 8D is a view of the clamp/transport bar taken along line D—D in FIG. 8.
Figure 8E:
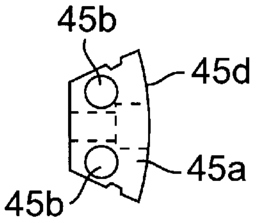
FIG. 8E is a view of the clamp/transport bar taken along line E—E in FIG. 8.

One embodiment of a holding key which is also adapted for retaining the leading edge of the envelope blank B adjacent to the die holder surface 21 so that the envelope blank B is accurately and securely held in position during the rotation of the die holder and when the cutting die cuts the panel P is illustrated by the transport bar 45 illustrated in FIG. 8. In the embodiment of the transport bar 45 illustrated in FIG. 8, the transport bar 45 has two feed tubes 45*b* which open to the inclined side face 45*a* and which communicate with a plurality of the orifices 45*c* on the outer surface 45*d* of the transport bar 45. The transport bar 45 may have any number of feed tubes 45*b* or orifices 45*c*. The feed tube 45*b* will be connected to the transport side of the air delivery assembly 90 in order to accurately and securely retain the envelope blank B adjacent to the transport bar surface 45*d*. Another embodiment of a key which is capable of feeding vacuum or compressed air to the key surface for retaining the envelope blank B or the panel P thereto is depicted by the feeder bar 42 in FIG. 9. The feeder bar 42 should have at least one feed tube 42*e* which communicates with a plurality of the orifices 42*a* on the outer face 42*f* of the feeder bar 42. In the embodiment illustrated in FIGS. 9A–C, the feeder bar 42 has one opening 42*c* in the inclined face 42*b* which divides into two feed tubes 42*e* although the key 42 may have any number of openings and feed tubes. In applications where the envelope blank B is disposed over the feeder bar 42, the orifices 42*a* and the feed tube opening 42*c* may be connected to the transport side of the air delivery assembly 90 in order to feed vacuum to the feeder bar 42 and retain the envelope blank B to the feeder bar surface 42*f*. Conversely, in applications where the cutting die 14 is disposed over the feeder bar 42, the feeder bar opening 42*c* is oriented so that it communicates with the vacuum side of the air delivery assembly 90, thereby retaining the panel P adjacent the feeder bar surface **42*f*.**

THE AIR DELIVERY ASSEMBLY

In accordance with certain objects of the invention, a novel air delivery assembly 90 is provided for supplying vacuum or compressed air to the die holder 16. The air delivery assembly 90 comprises a transport assembly 92 and a vacuum assembly 94. The transport assembly 92 is adapted to feed vacuum to the die holder 16 in order to retain the envelope blank B adjacent to the die holder 16 and "transport" the envelope blank B as the holder 16 rotates through the cutting operation. The vacuum assembly 94, in turn, is adapted to feed vacuum to the die holder 16 in order to retain the panel P cut from the envelope blank B adjacent to the die holder 16 until a predetermined position is reached wherein the panel P is released from the die holder 16. At predetermined positions, the transport and vacuum assemblies 92, 94 may feed compressed air to the die holder 16 in order to release the envelope blank B and the panel P, respectively.

In accordance with one aspect of the invention, the air delivery assembly comprises a stationary plate disposed at least at one end of the die holder and defining a groove member for selectively supplying vacuum and/or air. The die holder is operatively connected to the stationary plate so that a supply of vacuum or air is selectively supplied at the surface orifices of the die holder when rotation of the die holder aligns the longitudinal feed tubes with the groove member.

In the embodiment illustrated FIGS. 1–2, the right and left sides of the die holder 16 are designated as the vacuum and transport sides, respectively. The same reference numeral with the suffix "v" and "t" will be used to denote the similar components of the air delivery assembly 90 which are located in both the transport assembly 92 and the vacuum assembly 94, respectively.

THE VACUUM ASSEMBLY

Figure 7:
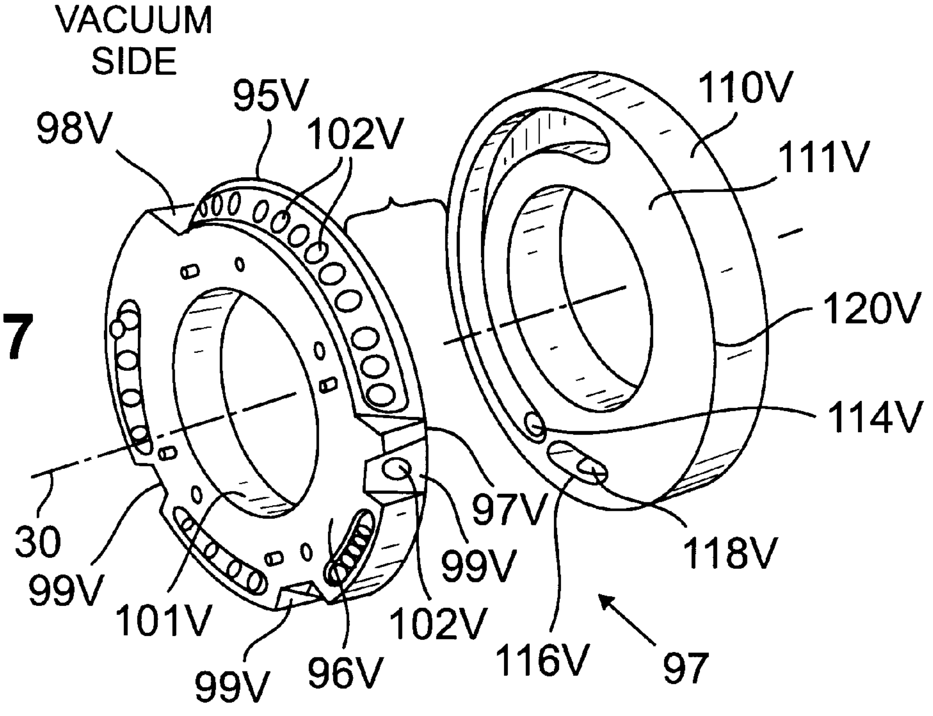
FIG. 7 is an exploded view of the connector plate and the stationary plate (vacuum side) taken along line 7—7 in FIG. 2.

Referring to the vacuum assembly 94 in FIGS. 1 and 7, it will be seen that the vacuum assembly 94 comprises a rotary connector plate **95*v* which is attached to and rotate in unison with the die holder 16, a stationary plate 110*v* fixed to the panel cutting machine 10, and an interface seal 105*v* which is disposed between the connector plate 95*v* and the stationary plate 110*v*** to form a substantially airtight seal.

The connector plate **95*v* has an interior side 96*v* adapted for matedly engaging the vacuum side 62*v* of the die holder 16 and an exterior side 97*v* adapted for engaging the interface seal 105*v*. The connector plate 95*v* has a central bore 101*v* for receiving the drive shaft 12. Since the inclined cover plate side 50*v* and key faces 42*b* and 44*b* project outwardly from the vacuum side 62*v* of the die holder 16, the interior side 96*v* of the connector plate 95*v* has inclined insets 98*v*, 99*v*, adapted to receive and engage the cover plate 50 and the keys 42, 44, respectively. When the cover plate 50 and the keys 42, 44 are attached to the cylindrical sections 22, 24 and the screws 52 are tightened, the force exerted by the inclined faces 50*v*, 42*b*, and 44*b* on the inclined insets 98*v* and 99*v*** assist in forming a substantially airtight seal.

In order to communicate vacuum and compressed air to the die holder 16, the connector plate **95*v* has a plurality of holes 102*v* corresponding to any feed tubes, including for example feed tubes 80, 82, 42*c*, 44*c*, in the die holder 16. As shown in FIG. 1, it is preferable to have a plastic or rubber gasket seal 103*v* disposed between the holes 102*v* and the feed tubes 80, 82, 42*c*, 44*c* to insure that an airtight seal is created between the metal die holder 16 and connector plate 95*v*.**

Once the connector plate **95*v* is properly aligned with the die holder side 62, the connector plate 95*v* and the die holder side 62 are attached together using screws 100*v*. It will be appreciated that the die holder 16 and the connector plate 95*v*** rotate in unison together.

Although any suitable metals or other materials may be used, it will be appreciated that the connector plate 95 and the stationary plate 110 are typically machined from aluminum so that direct contact between the rotating connector plate 95 and the stationary plate 110 is abrasive. In order to reduce such abrasion, the interface seal **105*v* is disposed between the connector plate 95 and the stationary plate 110. The interface seal 105*v* has a plurality of openings generally designated as 106*v* in FIG. 1 which correspond with the holes 102*v* in the connector plate 95*v*. The interface seal 105*v* may be attached to either the connector plate 95*v* or the stationary plate 110*v* although in the illustrated embodiment, the interface seal 105*v* is attached to the connector plate 95*v* using screws 100*v*. Although any suitable abrasion and temperature resistant material may be used, it has been found that manufacturing the interface seal 105*v* from a plastic known under the trade name Rulon manufactured by Furon Advanced Polymers is satisfactory. The plastic interface seal 105*v* may be easily replaced if it wears out so that the physical integrity of the expensive machined connector plate 95*v*** may be maintained.

The stationary plate **110*v* has an interior side 111*v* adapted to engage the interface seal 105*v*. The interior side 111*v* defines a vacuum groove 112*v* which is in communication with a vacuum source (not shown) via vacuum hose 114*v*, an air supply groove 116*v* which is in communication with a compressed air source (not shown) via air hose 118*v*, and a central bore, 120*v* adapted to rotatably receive the drive shaft 12**.

As the connector plate **95*v* rotates relative to the stationary plate 110, the connector plate holes 102*v* rotate and sequentially communicate with the vacuum and air grooves 112*v*, 116*v*. When the connector plate openings 102*v* and thus, the corresponding feed tubes 80, 82, 42*c*, 44*c*, in the die holder 16 are in communication with the vacuum groove 112*v*, the vacuum source is supplied to the corresponding orifices in communication with the feed tubes. Similarly, when the openings 102*v* are in communication with the air supply groove 116*v*, compressed air is supplied to the corresponding orifices in the surface 21 of die holder 16. Thus, it will be appreciated that extremely precise timing of the vacuum and compressed air may be supplied to the die holder 16 by adjusting the configuration and position of the vacuum groove 112*v* and the air groove 116*v*.**

Figure 6:
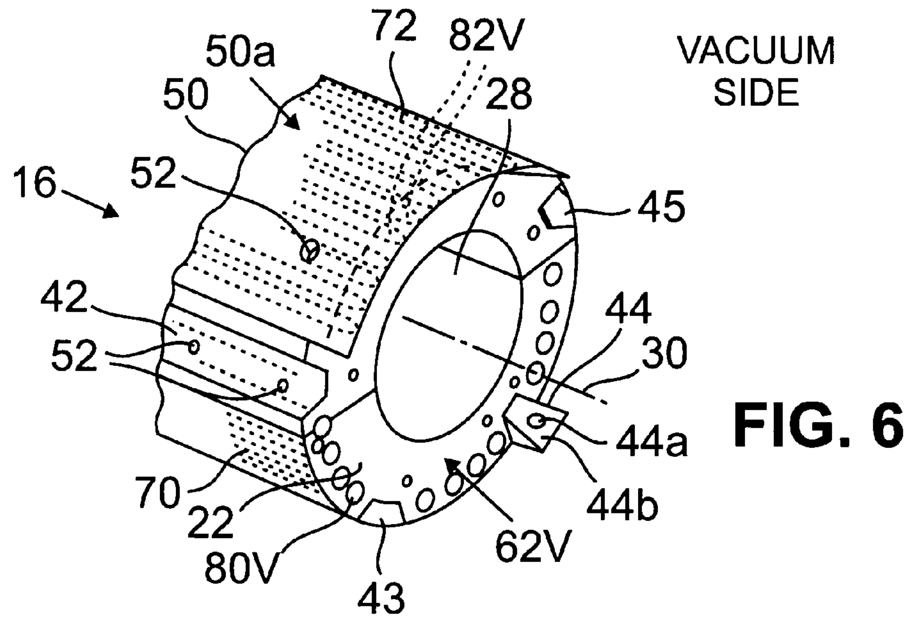
FIG. 6 is a perspective view of the vacuum face of the die holder taken along line 6—6 in FIG. 2.

Referring to FIG. 6, it will be appreciated that the cutting die 14 will be disposed along the periphery of the die holder 16. In order for the vacuum assembly 94 to feed vacuum or compressed air to the die opening 20 defined by the cutting edge 18, the operator selects the specific feed tubes which correspond with the orifices within the opening 20. The vacuum side of these feed tubes are left open so that they may communicate with the vacuum assembly 94 and the panel P cut by the cutting die 14 may be retained. On the other hand, the other feed tubes which do not communicate with the cutting die opening 20 or the panel P are sealed so that they do not communicate with the vacuum assembly 94. Any feed tube in the die holder 16 may be sealed at the vacuum side 62v of the die holder or at the corresponding connector plate holes 102v using any appropriate method including, for example, plugs, tape or the like.

As the die holder 16 and the connector plate 95v rotate relative to the stationary plate 110v, the open feed tubes sequentially communicate with the vacuum groove 112v and the air groove 116v. When the appropriate feed tube communicates with the vacuum groove 112v, vacuum is supplied to the surface 21 of the die holder 16 and the cutting die 14 so as to retain the panel P cut from the blank B within the die opening 20. Similarly, compressed air is supplied to the surface 21 of the die holder 16 and the cutting die 14 so as to blow the panel P from the cutting die 14 when the open feed tubes communicate with the air groove 114t.

THE TRANSPORT ASSEMBLY

Figure 5:
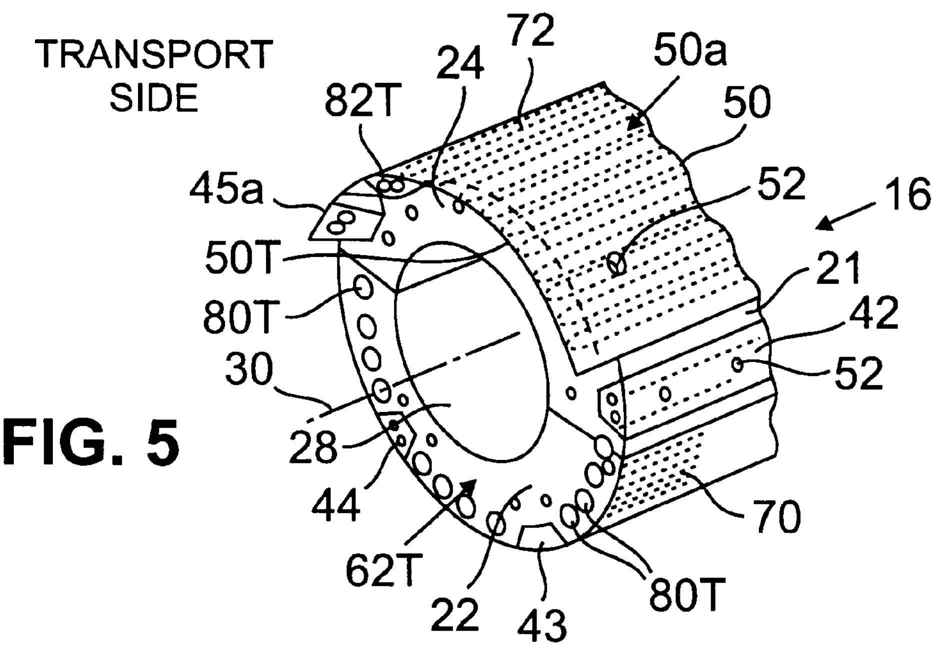
FIG. 5 is a perspective view of the transport face of the die holder taken along line 5—5 in FIG. 2.

The transport assembly 92, illustrated in FIGS. 1 and 5, is similar to the vacuum assembly 94 except that it is used to retain the envelope blank B instead of the panel P adjacent to the die holder surface 21. The transport assembly comprises a connector plate 95t, an interface plate 105t and a stationary plate 110t.

The connector plate 95t has an interior face adapted to matedly engage the transport side of the die holder. In the embodiment illustrated in FIGS. 1 and 5, the inclined faces of the cover plate 50t and the transport key 45a project outwardly from the transport side 62t of the die holder 16 so that the connector plate 95t has a corresponding inset 98t for secure engagement therewith. In order to feed vacuum and compressed air to the die holder 16, the connector plate 95t has a plurality of holes 102t which correspond with the feed tubes 45b, 80t, and 82t disposed on the transport face 62t of the die holder 16. The exact number and position of feed tubes around the periphery of the die holder 16 will vary in each particular application. Like the vacuum assembly 94, it is preferred that a plastic or rubber gasket seal 103t be disposed between the holes 102t and the feed tubes 82 to insure an airtight seal. Another O-ring 103t may also be disposed between the connector plate 95t and the other feed tubes (in the lower section 24) which are not being used. After the connector plate 95t is attached to the die holder 16 using screws 100t, the connector plate 95t and die holder 16 will rotate in unison.

The interface seal 105t, disposed between the connector plate 95t and the stationary die 110t, is identical with the interface seal 105v associated with the vacuum assembly except that its physical configuration will correspond with the holes 102t and bore 101t.

The stationary plate 110t is similar to the stationary plate 110v in that it has a vacuum groove 112t and air groove 116t. The orientation and physical size of the vacuum and air grooves 112t and 116t may be different to accommodate the timing differences associated with the transport assemblies' goal of retaining the envelope blank B as compared with the vacuum assemblies' goal of retaining the panel P.

During the cutting operation, it will be appreciated that the envelope blank B will be disposed adjacent the periphery of the die holder 16 so that certain orifices and the corresponding feed tubes will communicate with the envelope blank B. In order for the transport assembly 92 to feed vacuum or compressed air to the envelope blank B, the operator preselects the orifices and feed tubes which communicate with the envelope blank B. The transport side of feed tubes which communicate with the envelope blank B are left open. The other feed tubes which do not communicate with the envelope blank B are sealed.

As the die holder 16 and the connector plate 95t rotate, the open feed tubes communicate with the vacuum groove 112t and the air groove 116t in the stationary plate 110t. When the connector plate openings 102v are aligned and communicate with the vacuum groove 112t, vacuum is supplied to the surface 21 of the die holder 16 so as to retain the envelope blank B in the desired position. Similarly, compressed air is supplied to the surface 21 of the die holder 16 so as to release the envelope blank B from the die holder 16. Since the feed tubes which do not communicate with the envelope blank B are sealed the transport assembly does not feed vacuum or compressed air thereto.

Since the vacuum assembly 94 acts to control the release of the panel P cut from the envelope blank B whereas the transport assembly 92 acts to control the release of the envelope blank B, it will be appreciated that the configuration and position of the vacuum and air grooves 112, 116 in the vacuum and transport assemblies 94, 92 will vary with the position and size of the die cutter 10 and the size and position of the envelope blank B. Similarly, although the air delivery assembly 90 has been described with respect to the illustrated embodiments of the feed tubes associated with the illustrated die holder 16, the number, configuration and radially position of the feed tubes may be varied as long as the feed tubes are capable of communicating with the vacuum and air grooves in the air delivery assembly during the die holder's rotation.

OPERATION

In operation, the rotary cutter 10 is adapted to be installed on a conventional drive shaft 12. Typically, the cylindrical sections 22 and 24 may be disposed so that the bore 28 engages the shaft 12 and the screws 26 are tightened to attach the sections 22 and 24 about the shaft 12. The cutting die 14 and the keys may be attached to the cylindrical sections 22 and 24 as previously explained.

Figure 11A:
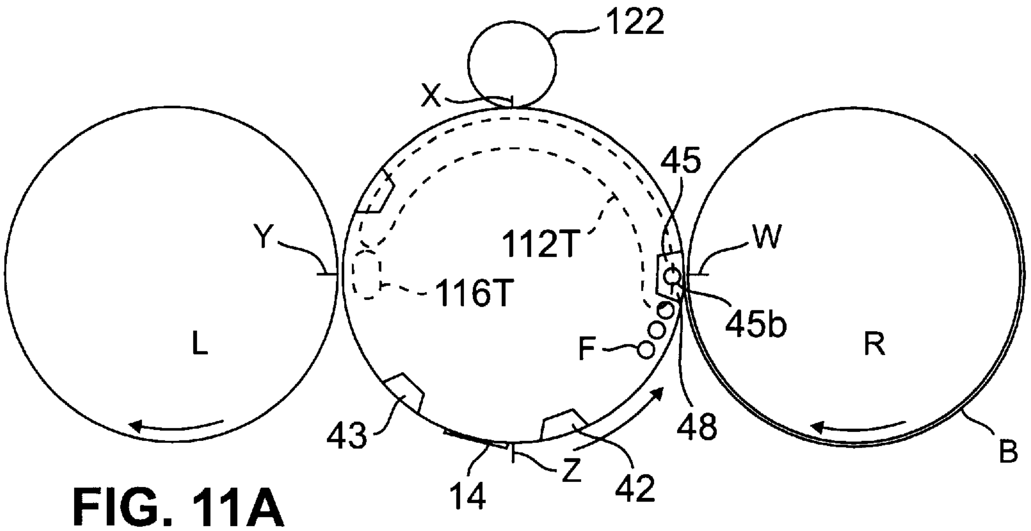
FIG. 11A illustrates the position of the rotary cylinder as transfer cylinder R feeds an envelope blank to the die holder.
Figure 11B:
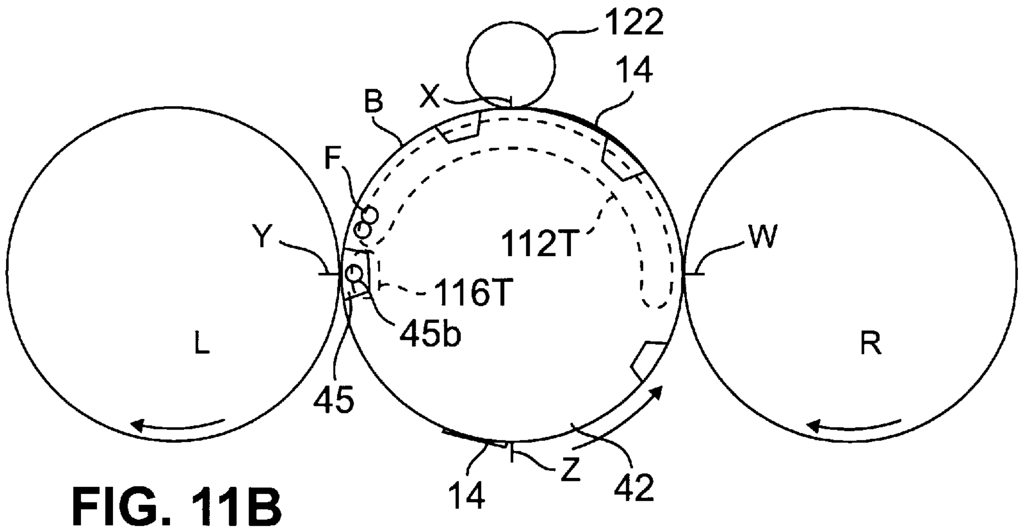
FIG. 11B illustrates the position of the rotary cutter as a panel is cut from the envelope blank.
Figure 11C:
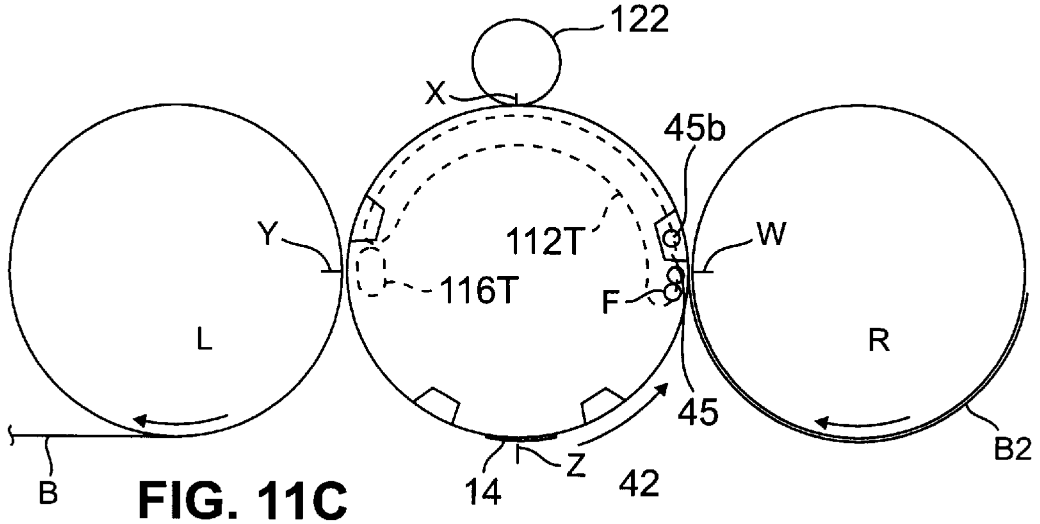
FIG. 11C illustrates the position of the rotary cutter as the envelope blank is released to transfer cylinder L and the die holder receives another envelope blank from transfer cylinder R.
Figure 12A:
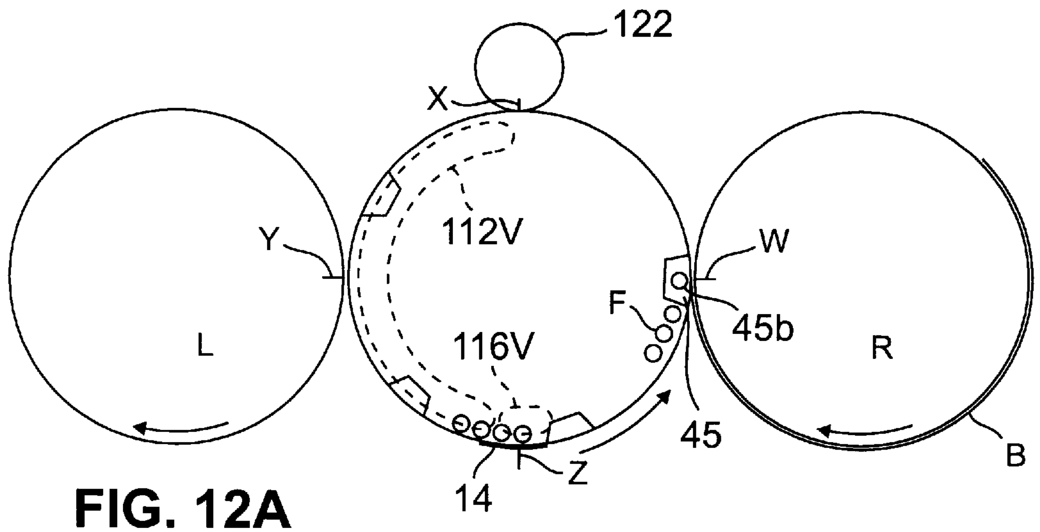
FIG. 12A illustrates the position of the rotary cylinder as transfer cylinder R feeds an envelope blank to the die holder.
Figure 12B:
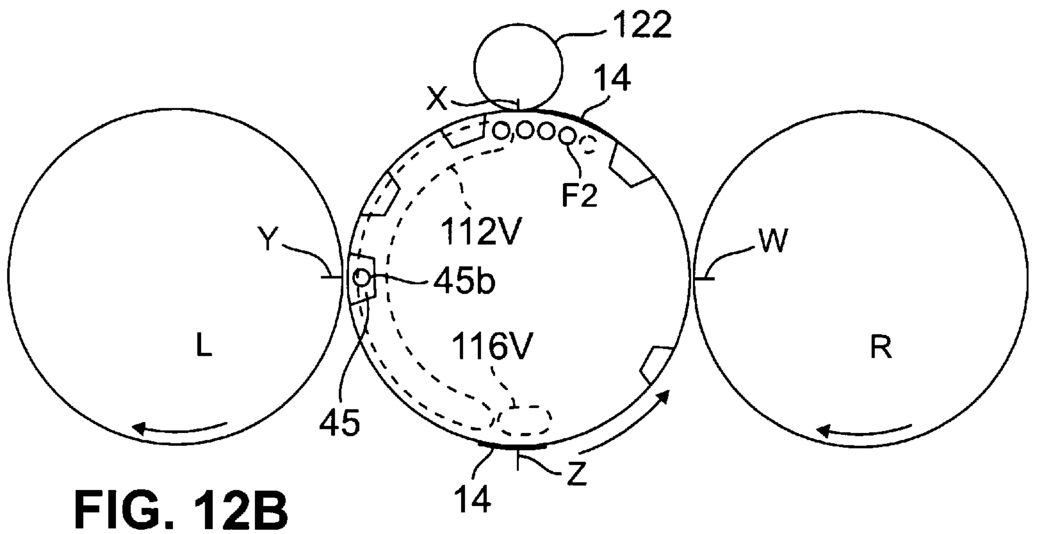
FIG. 12B illustrates the position of the rotary cutter as a panel is cut from the envelope blank.
Figure 12C:
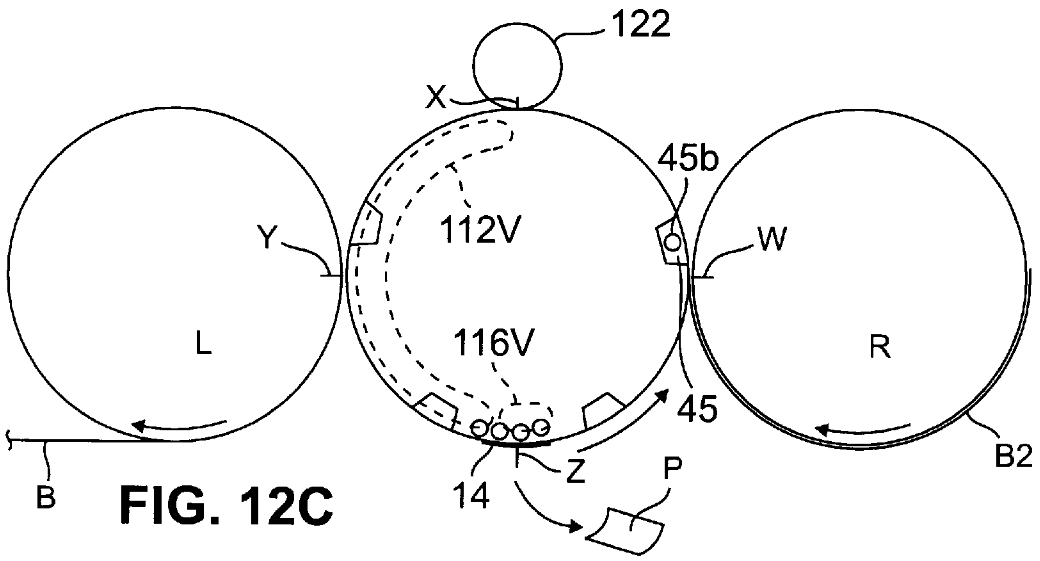
FIG. 12C illustrates the position of the rotary cutter as the envelope blank is released to transfer cylinder L and the die holder receives another envelope blank from transfer cylinder R.

Although any type of conveyor assembly may be used which moves the envelope blanks B in serial order to the rotary cutter 10 which cuts out the panels P, in the illustrated embodiment, the conveyor system comprises a cylinder R which delivers the uncut envelope blank B to the rotary cutter 10 and a cylinder L which transports the cut envelope blank B away from the rotary cutter 10. In the embodiments illustrated in FIGS. 11A–12C, cylinders L and R are rotating in a clockwise direction and the rotary cutter 10 is rotating in a counter clockwise direction, although the rotation may be varied depending upon the particular application. FIGS. 11A–C illustrate the operation of the transport assembly 92 and FIGS. 12A–C illustrate the operation of the vacuum assembly 94 as viewed along the longitudinal axis 30 and from left (transport) side of the die cutter 10 as shown in FIG. 2.

Turning first to FIGS. 11A–C which schematically illustrate the operation of the transport assembly 92, it will be seen that the top portion of the stationary plate 110t contains the vacuum groove 112t and the air groove 116t depicted by the broken lines. The transfer cylinder R delivers the envelope blank B to the transfer bar 45 at transfer point W between the die holder 16 and cylinder R. The transport bar 45 has orifices 45c which engage the leading edge of the envelope blank B and feed tubes 45b which communicate with the transport side 62t of the die holder 16 and the transport assembly 92. When the feed tubes 45b communicate with the vacuum groove 112t, vacuum is feed to the orifices 45c so that the transport bar 45 retains the envelope blank B adjacent to the die holder surface 21. It will be appreciated that other feed tubes of the die holder 16, generally designated as F in FIG. 11A, will also communication with the transport assembly 92 as the die holder rotates in the counterclockwise direction. Like the feed tube 45b and orifices 45c in the transport bar 45, each feed tube F and the corresponding orifices will operate to retain the entire envelope blank B adjacent to the die holder surface 21. It will be appreciated that the feed tubes F and the corresponding orifices which communicate with the transport assembly 92 are subjacent the envelope blank B and do not communicate with the panel P which is cut from the blank B. Any feed tubes which communicate with the panel P are sealed to the transport assembly 92.

As the die holder 16 rotates, the feed tube 45b and the envelope blank B pass between the cutting bar 122 and the die holder 16 (point X) but since the cutting die 14 is not present, the envelope blank B passes through without being cut. The feed tube 45b continues to communicate with the vacuum groove 112t until the end of the vacuum groove 112t at which point the envelope blank B is ready to be transferred to the transfer cylinder L as shown in FIG. 11B at point Y. When the feed tube 45b exits the vacuum groove 112t and enters into the air groove 116t, the vacuum to the feed tube 45b and corresponding orifices 45c is terminated and compressed air is fed to thereto which acts to release the envelope blank B. Simultaneously, the transfer cylinder L applies a vacuum which transfers the envelope blank B from the die holder 16 to cylinder L.

The transport bar 45 continues to rotate to the transfer cylinder R to obtain the next successive envelope blank B at point W as shown in FIG. 11C.

Turning next to FIGS. 12A–C which schematically illustrate the operation of the vacuum assembly 94, it will seen that the vacuum groove 112v and the air groove 116v are disposed in the left portion of the die holder 16. When the transfer cylinder R first delivers the envelope blank B to the transfer point W between the die holder 16 and cylinder R, only the transport bar 45 engages the envelope blank B as described above. The feed tubes 45b associated with the transport bar 45 and the feed tubes F which communicate with the envelope blank B are sealed so that they do not communicate with the vacuum assembly 94. On the other hand, the feed tubes, generally depicted as F2, which are subjacent the opening 20 of the cutting die 14 are in communication with the vacuum assembly 94.

As the die holder 16 rotates, the feed tubes F2 and the cutting die 14 engage the envelope blank B at point W. The feed tubes F2 remain inactive because they are not in communication with the vacuum or air grooves 112v, 116v of the vacuum assembly 94.

As shown in FIG. 12B, when the envelope blank B passes between the cutting bar 122 and the cutting die 14 at point X, the panel P is cut from the envelope blank B. The illustrated cutting bar 122 is a stationary bar but those skilled in the art that other embodiments may be used, including, for example, rotary cutting bars or anvils, square or circular cutting bars and the like. At point X, the feed tubes F2 communicate with the vacuum groove 112v. The vacuum source feeds vacuum to the feed tubes F2 and the corresponding orifices which are within the opening 20 of the cutting die 14. The vacuum retains the panel P adjacent the outer surface 21 of the die holder 16.

As the die holder 16 continues to rotate, the transport bar 45 reaches the transfer point Y with cylinder L and the envelope blank B is transferred to cylinder L. The cutting die 14 subsequently reaches the transfer point Y, but the feed tubes F2 remain in communication with the vacuum groove 112v so that the panel P is not released from the die holder 16.

As shown in FIG. 12C, the die holder 16 continues to rotate until the cutting die 14 reaches point Z wherein the feed tubes F2 leave the vacuum groove 112v and enter the air groove 116v. The air groove 116v feeds compressed air to the feed tubes F2 which subsequently releases the panel P into a scrap collection bin for later disposal.

In order to assist the disassembly of die holder 16 from the drive shaft 12, the cylindrical section 22 may have a plurality of holes 125 which cooperate with a screw handle 126. When the screw handle 126 is screwed into the holes 125, the tip 126a of the handle 126 creates space between the cylindrical sections 22, 24 and the drive shaft 12 which enables the operator to easily disengage the die holder 16 therefrom. The handle tip 126a may be made from a relatively soft metal such as brass or the like which will not damage the drive shaft 12. The screw handle 126 may also be used to carry the die holder 16. The magnetic clamp assemblies 200 retain and hold the cutting die 14 adjacent to the die holder surface 21 as illustrated in FIGS. 16–27. FIGS. 16A and 16B illustrate embodiments of cutting dies 202, 204 which are adapted to be used in conjunction with the magnetic die holder 216.

In the embodiment illustrated in FIGS. 17–25, a plurality of recesses 218 are formed in the die holder 216 for receiving individual magnets 220. In the embodiment illustrated in FIGS. 26–27, the die holder 316 has a plurality of longitudinally extending grooves 318, each groove 318 being adapted to receive an insert 320. Each insert 320 has a plurality of recesses 322 for receiving individual magnets 220. It has been found that it is easier to manufacture and machine the recesses 322 in the insert, rather than the relatively large and bulky die holder, and subsequently install the insert 320 in the die holder 316.

Figure 20:
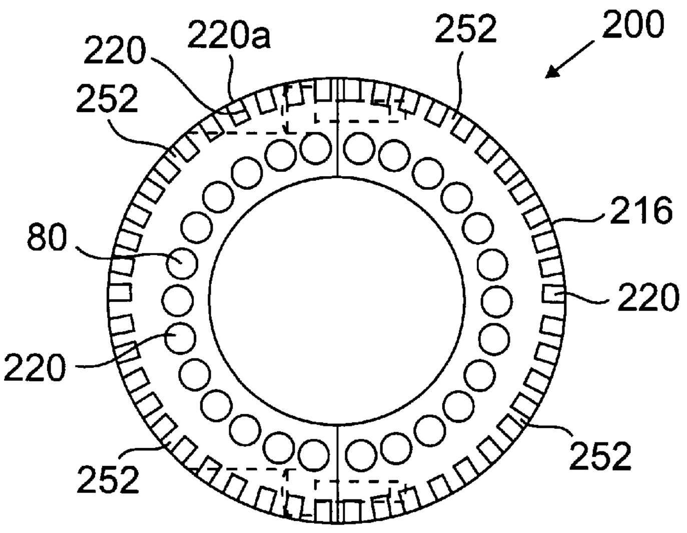
FIG. 20 is a view of the die holder taken along line 20—20 in FIG. 19.
Figure 21:
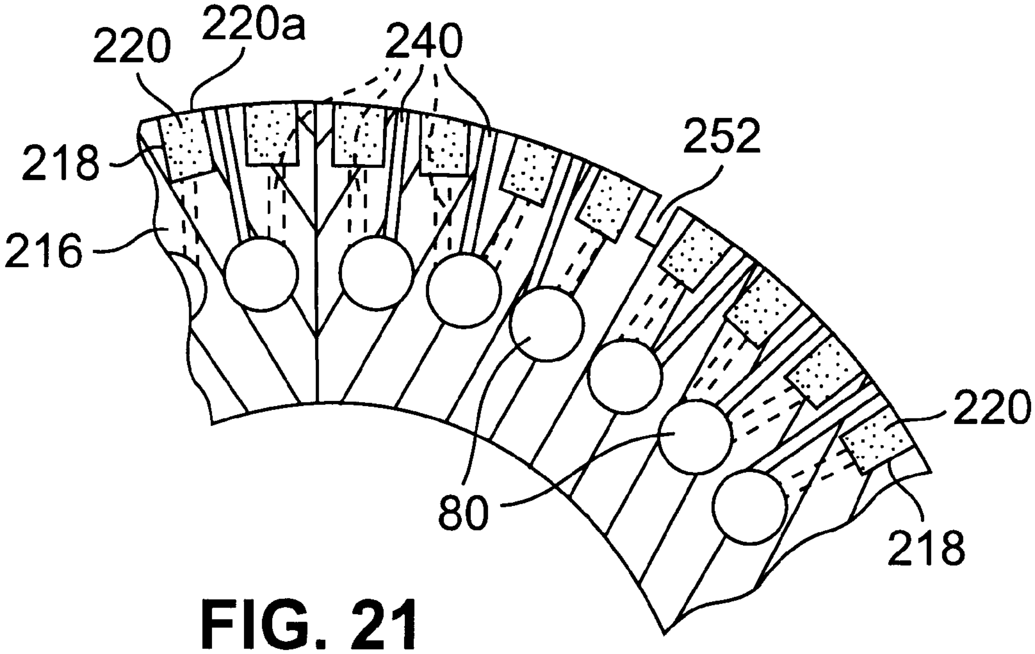
FIG. 21 is a view of the die holder taken along line 21—21 in FIG. 19.
Figure 22:
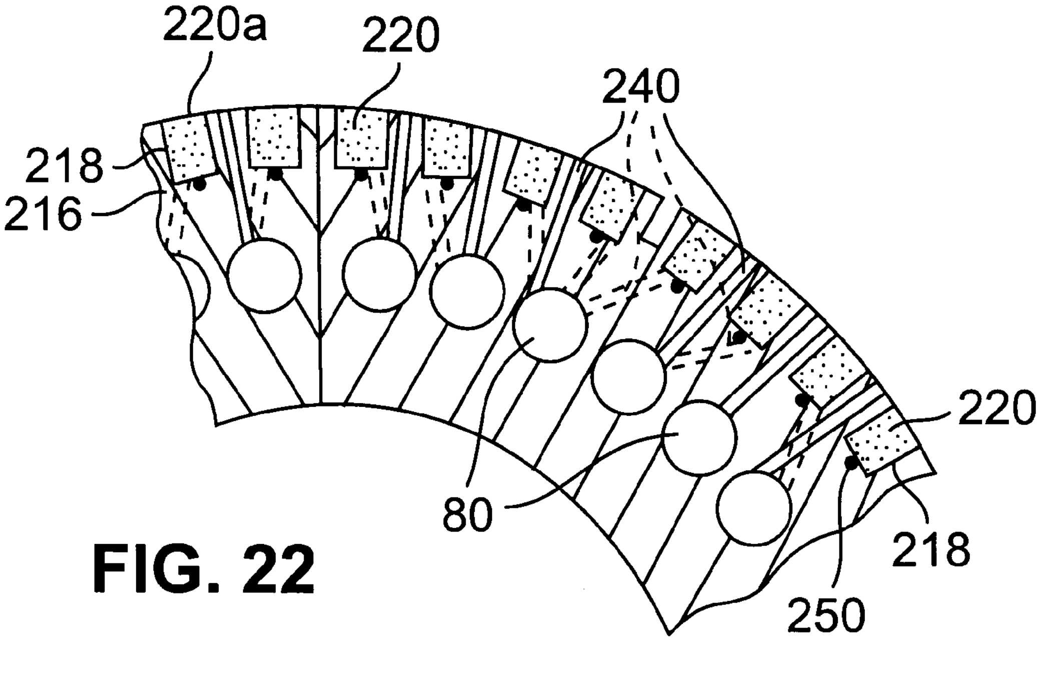
FIG. 22 is a view of the die holder taken along line 22—22 in FIG. 19.
Figure 23:
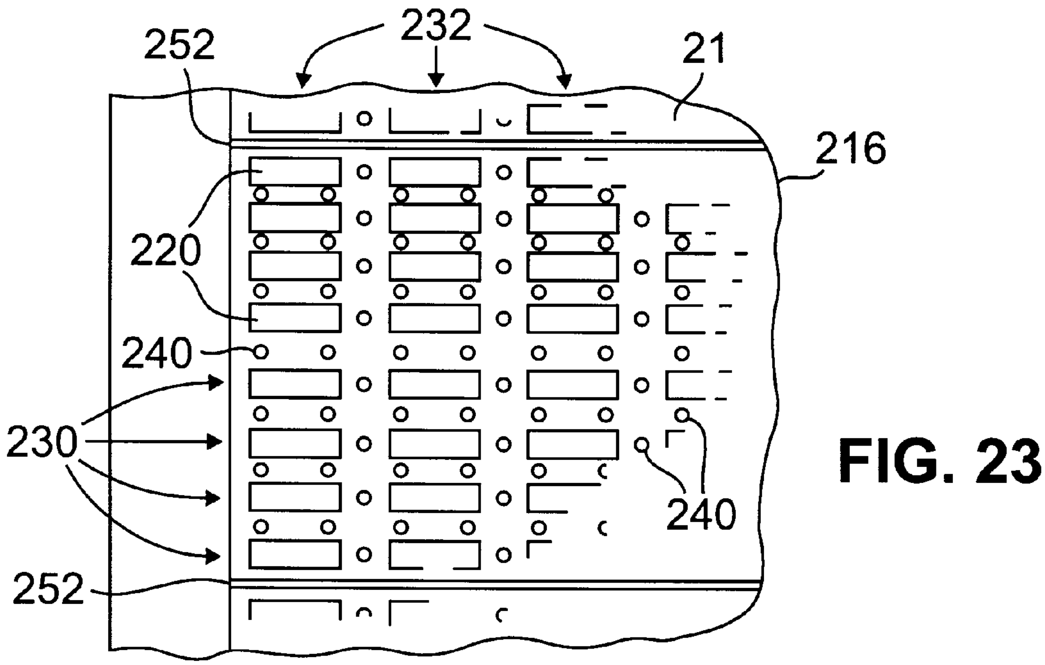
FIG. 23 is a partial elevational view illustrating the magnetic die holder.
Figure 24:
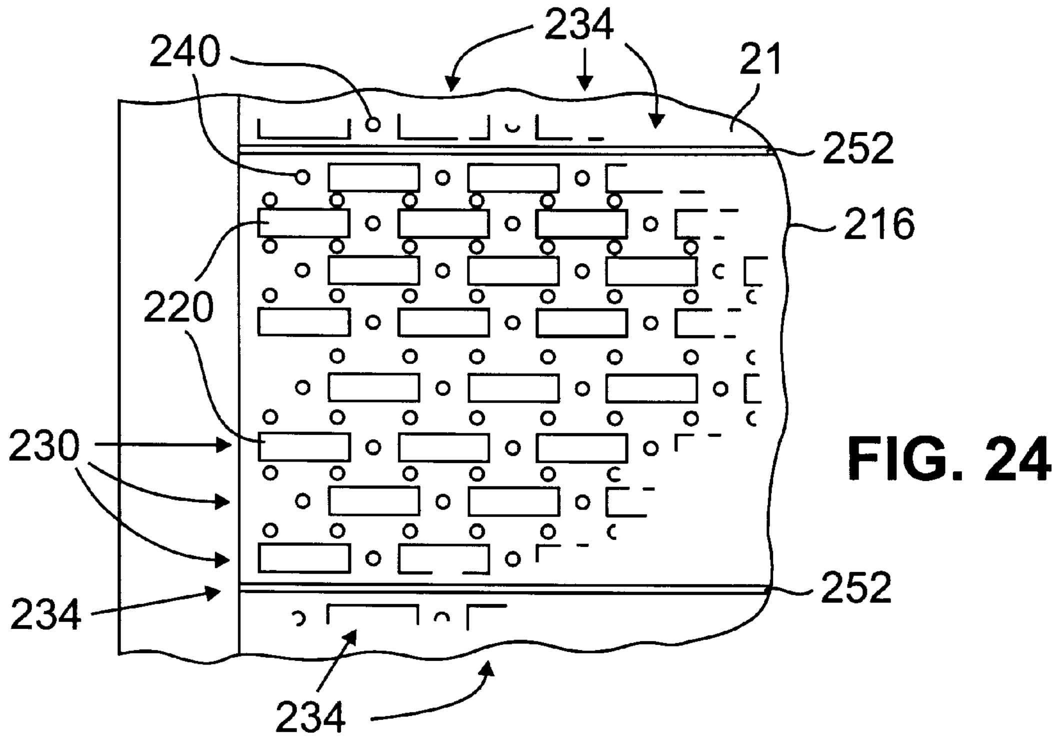
FIG. 24 is a partial elevational view of another embodiment of the magnetic die holder.

As shown in FIGS. 20–22, the outer surface 220a of the magnets 220 are flush with die holder surface 21. Although the dimensions of the magnets may be varied depending upon the application, it is preferred that the width be from about 0.125 to about 0.25 inches, the length from 0.375 to about 0.75 inches, and the height from about 0.175 to about 0.25 inches.

As soon as the cutting die 14 is brought near the die holder surface 21, the magnets 220 attract the thin metal cutting die 14. The cutting die 14 is, thus, magnetically retained adjacent to the surface 21 of the die holder 16. The magnetic force will flatten the entire area of the cutting die 14 against the die holder surface 21 so that there is no slack present between the die holder surface 21 and the cutting die 14. The cutting die 14 is positioned and orientated so that it properly cuts the envelope blanks B with the aid of the puck locators $2^{4}0$a and orifices 240 as described hereinabove.

A plurality of air orifices 240 are disposed in the die holder surface to retain the envelope blank B and the panel P adjacent to the die holder surface 21. The other portions of the die holder surface which do not receive the blank B or the panel P do not require orifices 240. The air orifices 240 are in radial communication with the plurality of corresponding air feed tubes 80. The feed tubes 80 and the corresponding orifices 240 may be connected to the novel vacuum and compressed air delivery system described above or to a conventional source of vacuum and compressed air (not shown).

It is generally preferred to maximize the number and distribution of the orifices 240 while minimizing the number and distribution of the expensive magnets 220. Thus, it is preferred that at least some orifices 240 be disposed between substantially all of the adjacent magnets 220 in order to maximize the distribution and effect of the orifices 240, thereby permitting the cutting die 14 to be placed anywhere on the die holder surface 21 and the panel P cut from the blank B to be retained during the cutting operation. It will be appreciated that any number of orifices may be disposed between adjacent magnets.

In the embodiment illustrated in FIGS. 17–19, 23 and 25, the recesses 218 and the magnets 220 are disposed in parallel, horizontal rows 230 and columns 232 such that the longitudinal axis of the columns 232 in each adjacent row 230 are aligned with each other. In the embodiment illustrated in FIG. 21, the recesses 218 and magnets 220 are disposed in parallel, horizontal rows 230 and columns 234 such that the longitudinal axis of columns 234 in each adjacent row 230 are offset relative to each other. Substantially all of the rows 230 have orifices 240 disposed between substantially all of the adjacent magnets 220. Similarly, it is preferred that the die holder 216 have alternating rows 230 of magnets 220 and orifices 240 and alternating columns 232, 234 of magnets 220 and orifices 240. Other arrangements of magnets 220 and orifices 240 will be known to those skilled in the art It should now be appreciated that the illustrated embodiments maximize the ability of the die opening 20 to communicate with orifices 240 wherever the cutting die 14 is disposed on the die holder surface 21. In contrast, conventional magnetic die holders which have alternating rows of magnets and orifices or alternating columns of magnets and orifices limit the placement positions of the cutting die 14 because such a die holder suffers from an insufficient number of orifices in the vicinity of the die opening 20 for retaining the panel P.

Figure 25:
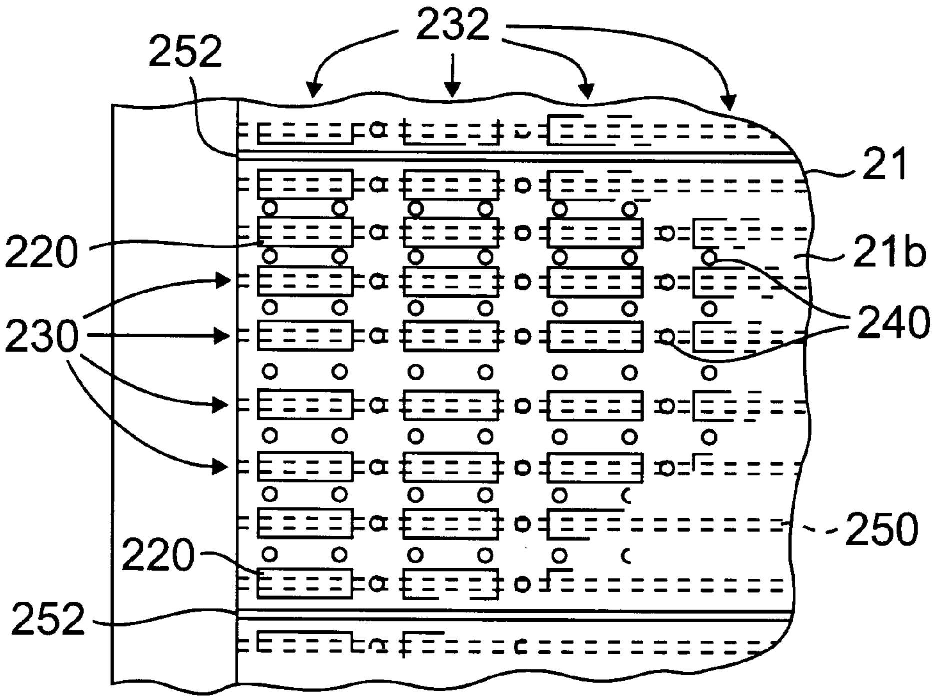
FIG. 25 is another view of the magnetic die holder illustrated in FIG. 23.
Figure 26:
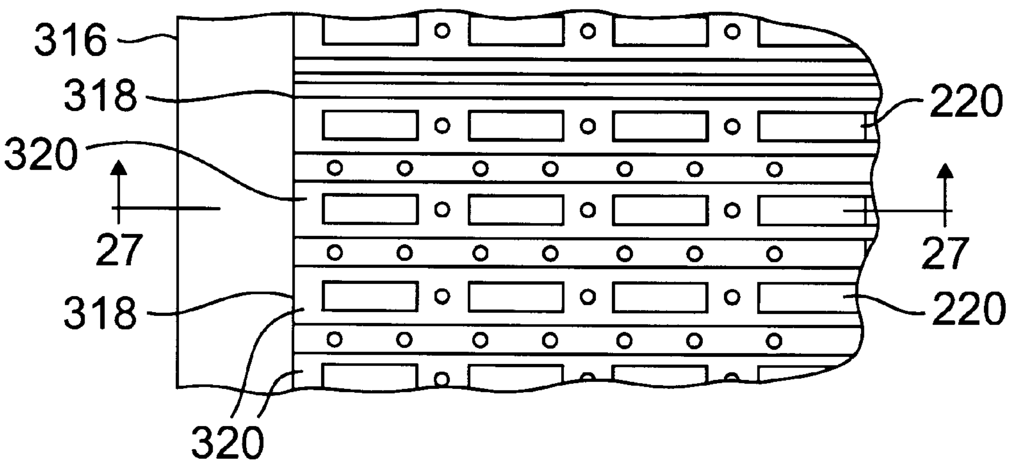
FIG. 26 is a view of another embodiment of a magnetic die holder.

In order to increase the magnetic effect of the magnets 220, the individual magnets 220 may have a magnetic wire 250 extending between the individual magnets 220. In FIGS. 22 and 25, for example, each row of magnets 220 has a centrally disposed wire 250 extending along the axis 30 and connecting the individual magnets 220 in the respective row 230. Research proves that the wire 250 acts as a magnetic flux conductor and increases the overall magnetic effect of the magnets 220. Referring to FIG. 22, it will be seen that the orifices 240 which are in radial communication with the feed tubes 80 are disposed so that they do not interfere with the centrally disposed wire 250. Alternatively, the wire 250 may be offset from the center of the magnets 240.

The cutting die 14 may be removed from the die holder 216 by exerting a significant tangential force thereon or by reducing the local induction of the magnets 240. Unfortunately, the cutting operation may create sufficient tangential forces including, for example, the forces created by the rotation of the die holder 216, which may displace a cutting die 14 of the type illustrated in FIG. 16*b* or cause the die 14 to slip such that it is improperly orientated relative to the blank B. In order to prevent such displacement or slippage, the die holder 216 preferably has at least one relatively thin slot 252 which is adapted to receive the leading end 202*a* of the cutting die 202 illustrated in FIG. 16*a*. Although the illustrated embodiment of the slot 252 extends along the longitudinal axis 30, it is may also be angularly displaced relative to the longitudinal axis 30. The engagement between the leading end 202*a* and the slot 252 prevents the cutting die 202 from slipping or becoming angularly displaced during the cutting operation. The slot 252 also eases assembly, making it possible to easily and readily mark and obtain the proper position of the die 202 on the die holder surface 21 without the need for cumbersome tools required in many conventional mechanical clamping assemblies. The slot 252 may be disposed anywhere along the periphery of the die holder 216. In another embodiment, the die holder 216 may have two slots 252 for receiving a cutting die 14 of type illustrated in FIG. 16—one slot receives the leading end 14*a* and the second slot receives the trailing end 14*b*. The width of the slot 252 may vary but it has been found that a width from about 0.004 to about 0.1 inch is sufficient to receive the cutting die end.

FIGS. 28–32 illustrate a novel valve assembly 260 for selectively controlling the flow of air to each of the feed tubes 80 from a source of vacuum or compressed air in contrast to conventional methods which use plastic plugs and tape which are easily removed or lost The illustrated embodiment of the end plate 95 is a disc shaped body having front and back sides 97, 96 and an end peripheral face 262. The end plate 95 has a plurality of longitudinally extending holes 102 connecting the front and back sides 97, 96 and which are adapted to align with the feed tubes 80 disposed on the die holder 216. Each hole 102 has a corresponding axially extending valve hole 264 adapted to receive the valve member 260.

Figure 30:
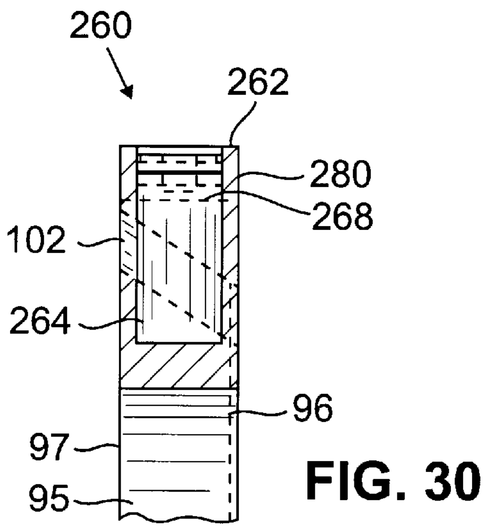
FIGS. 30–31 are sectional views taken through lines 30—30 and 31—31, respectively, in FIG. 29.

The valve member 260 has a bore 266 which is capable of selectively aligning with the corresponding end plate hole 102. When the valve bore 266 is aligned with the end plate hole 102 as shown in FIG. 30, the bore 266 and the hole 102 cooperate to feed vacuum or air through the end plate 95. When the valve member 260 is rotated 90 degrees as shown in FIG. 31, the valve bore 264 is perpendicular to the end plate hole 102 and the valve member 260 seals the end plate hole 102.

Figure 31:
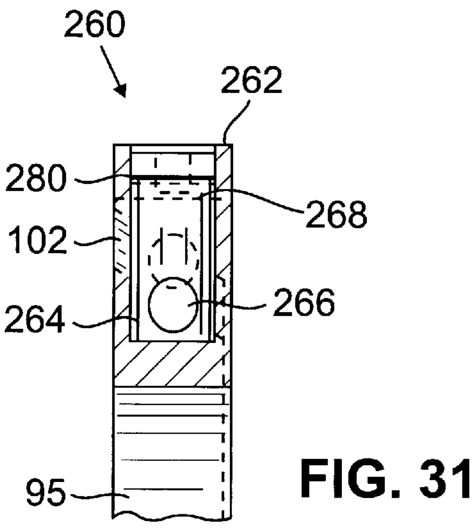
Figure 32:
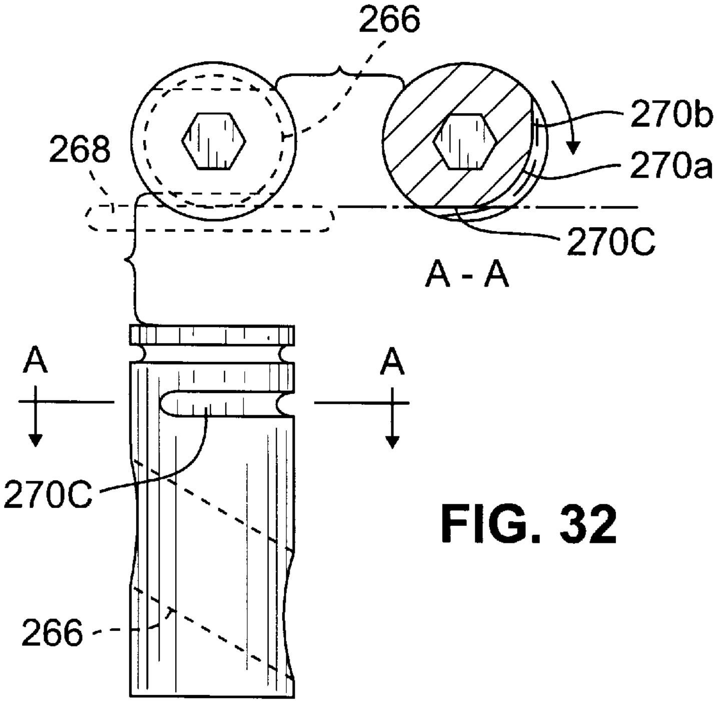
FIG. 32 is an elevational and sectional view of one embodiment of a valve member.

In accordance with certain objects of the invention, a preferred embodiment provides a valve member 260 which is capable of selective and controlled rotation between a first closed position wherein the valve member 260 prevents flow through the end plate hole 102 (as shown in FIG. 31) and a second, open position wherein the valve member 260 permits flow through the end plate hole 102 (as shown in FIG. 30). Referring to FIGS. 30–32, the valve member 260 has a cam surface 270 which engages a pin 268 disposed in the valve hole. The shape of the cam surface 270 is such that the valve member 260 may rotate only between the closed and open positions. It will be appreciated that the valve member 260 insures that the individual end plate hole 102 is sealed by defining easily recognizable opened and closed positions. In the illustrated embodiment, the cam surface 270 has a curved portion 270*a* connecting two substantially perpendicular sides 270*b*, 270*c* which limit the rotation of the valve member. Although the head of the valve member 260 has a hex head be adapted to receive an allen driver, the head may be adapted to receive any type of manual turning device including, for example, a screw driver and the like.

The valve member 260 also has a seal member 280 which provides a relatively airtight seal between the valve member 260 and the end plate 95. Although the illustrated embodiment of the valve member 260 is disposed in the end plate 95, it will be appreciated that the valve member 260 may also be disposed in the die holder 216 such that it communicates with the feed tube 80.

THE UNIVERSAL ROTARY CUTTER

Figure 33:
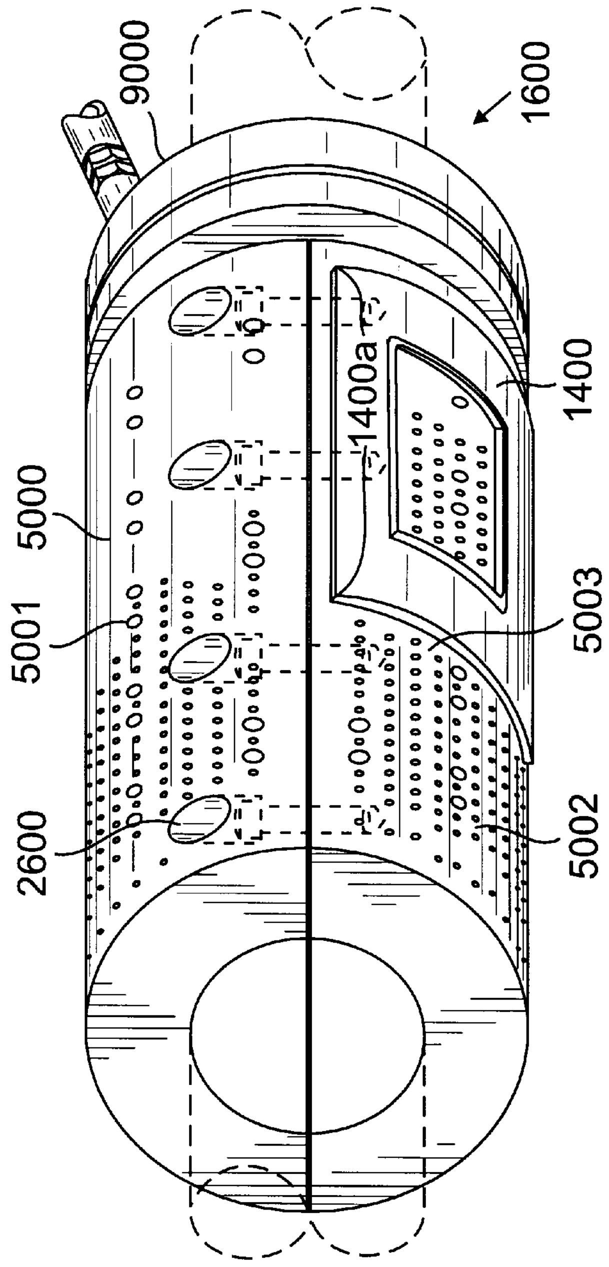
FIG. 33 is a perspective view of an assembled rotary cutter assembly in accordance with a universal holder assembly as provided by the present invention.
Figure 34:
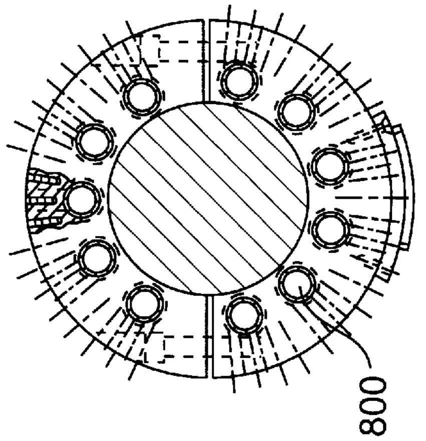
FIG. 34 is an end view of the cylinder of the rotary cutter assembly of FIG. 33.
Figure 35:
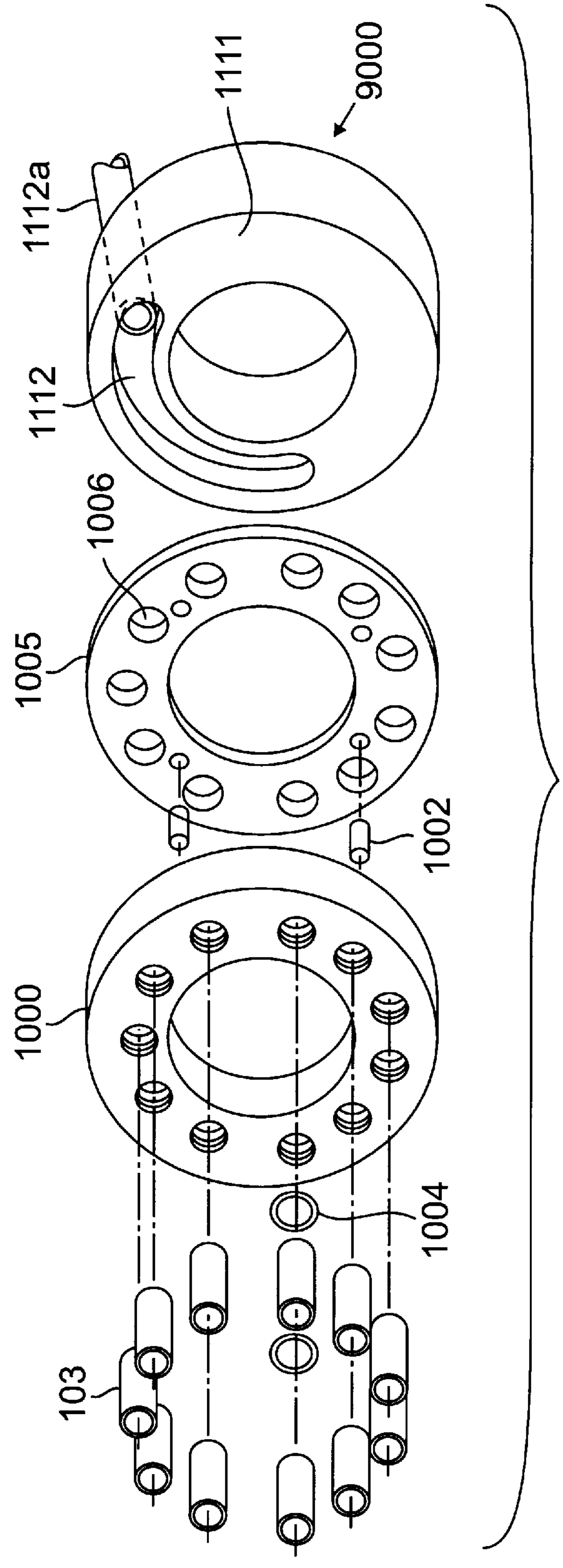
FIG. 35 is an exploded view of the selective air transfer assembly of the alternate embodiment of FIG. 33.

The present invention also provides a novel universal rotary cutter 1600 as shown in FIGS. 33–35. The universal rotary die holder 1600 includes one or more cylinder segments 5000 (FIG. 33) having a through bolt stud 2600 maintaining the two cylinder segments 5000 together. The universal holder of the present invention could also utilize either a non-magnetic or magnetic rotary die holder 16 as shown and described hereinabove with other embodiments.

The universal rotary cutter could also utilize the key system recited hereinabove.

For purposes of illustration, the universal die holder 1600 utilizing a magnetic die holding action includes rows of magnets 220, 320 (FIG. 26, 27) and a plurality of air orifices 5003 (FIG. 33), which, like orifices 240 in the previous embodiments, are in radial communication with a plurality of feed tubes 800 (FIG. 34). The feed tubes 800 are in corresponding communication with inserts 1003 which mate, via O-rings 1004, to feed plate 1000. The feed plate 1000 is mated via locator pins 1002 to air delivery plate 1112. The feed tubes 800 are thus in selective communication with air delivery system 9000.

The air delivery system 9000 (FIG. 33) correspondingly provided operator in a similar fashion as hereinabove deserted in reference to the air delivery system 90 (FIG. 1). The novel addition includes provision of a plurality of controllable air valves 5001 formed in and through the surface of each cylinder segment 5000 that are in selective communication with the feed tubes 800.

Figure 33A:
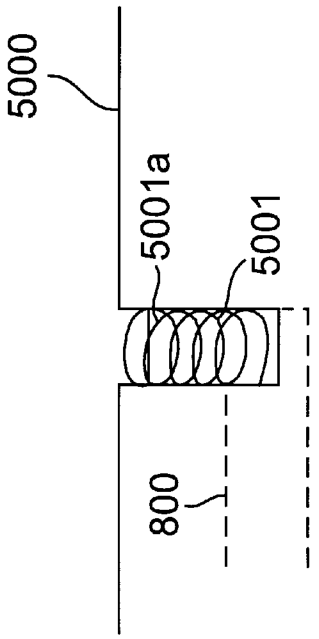

Each air valve 5001 includes a screw plug 5001*a* (FIG. 33A) which can be removed as desired. When a screw plug 5001*a* is removed, either air or vacuum can be allowed to the surface of the universal rotary cutter 1600 via the operation of air delivery system 9000. The present invention envisions that, if desired, each air orifice 5003 could carry an air valve 5001. Thus, either vacuum or air can be provided to any one orifice 5003 and could be selectively controlled by a valve 5001.

Figure 36:
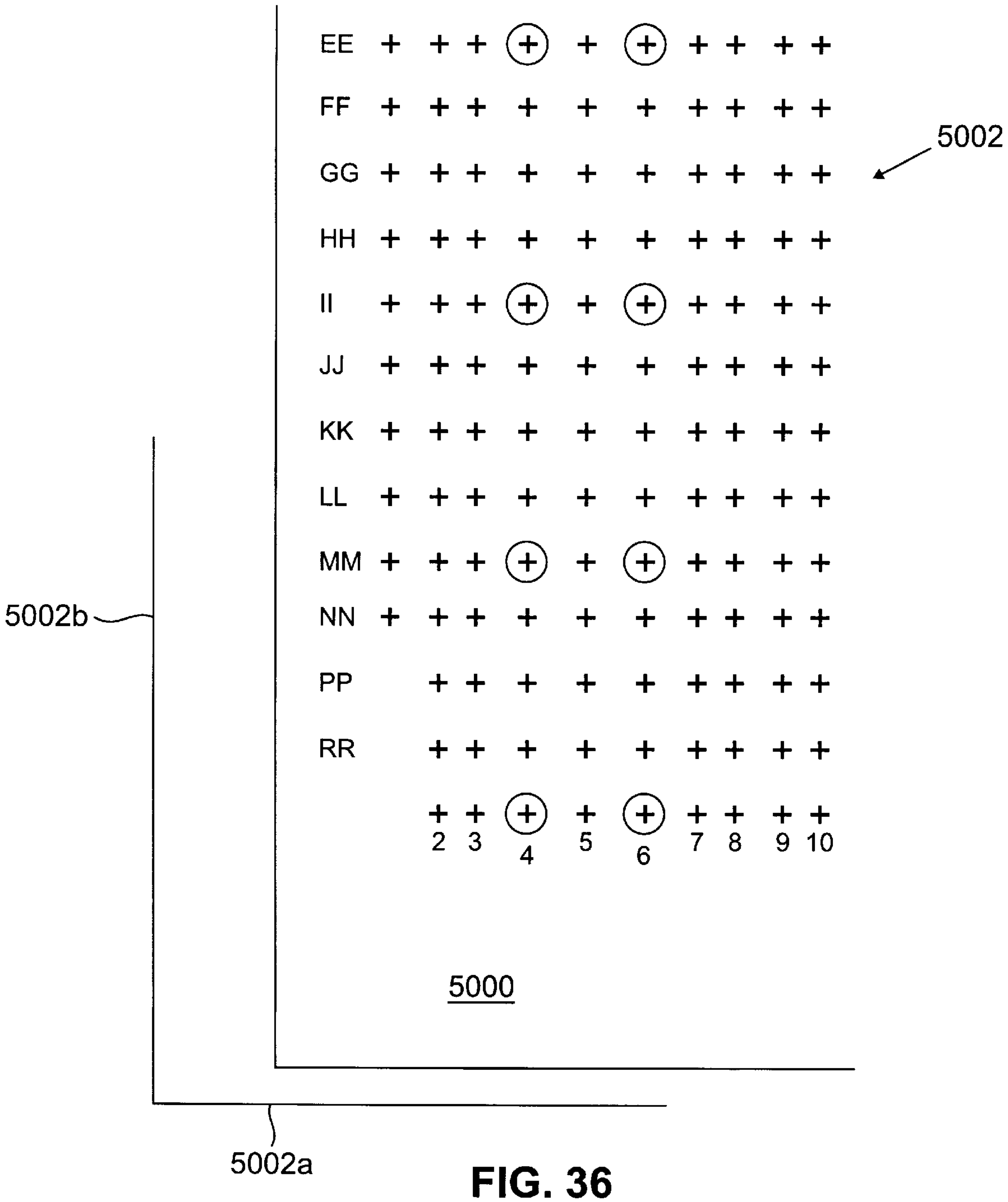
FIG. 36 is a close-up plan view of the cutting die plate locator system of FIG. 33.

A further provision of the universal rotary die holder 5000 of the invention is directed to providing a system of die holder locating coordinates 5002. The die holder reference means or reference indicator locating coordinates are placed in rows and columns similar to the magnets 240 of FIGS. 25–27, except that the coordinate system provided works to easily and accurately place the die plate 1400 at any desired location on the universal die holder 1600. In practice, one aligns marks 1400*a* on the die plate 1400 with the desired coordinates provided by one or more die holder coordinates 5002. This practice is extremely useful because a change in the position of the die plate 1400 could be attained simply by looking up a predetermined listing of possible coordinates (not shown) for any number of desired cutting locations. For example, as shown in FIG. 36, the die holder coordinator system 5002 provides longitudinal coordinates 5002*a* (numerals 2,3,4, etc.) and radial or latitude coordinates 5002*b* (letters EE, FF, GG, etc.) that provide a grid similar to latitude and longitude on a topographical map (not shown). Utilizing locator marks 1400*a* on the die plate 1400, and the grid provided by the die holder coordinate system 5002, the die plate could be placed anywhere and in any position on the universal die holder 1600. It should be noted that in a situation where one or more holding keys 42–45 (FIG. 1) are utilized, placement of the cutting die 1400 would have to be coordinated with the corresponding usage of the holding key(s) 42–45.

Further, if a non-magnetic cylinder were used without holding keys, the cutting die 1400 could be held solely by the vacuum action of orifices 5003 and air valve 5001. Lastly, when a magnetic system is desired, rows of magnets 240 (FIGS. 23, 27) would be utilized as set herein regarding other embodiments, cooperating with air valves 5001 and orifices 5003, in the same manner as air orifices 72 (FIGS. 1, 2) shown in conjunction with previous embodiments of the invention.

Thus, it will be seen that a die cutting apparatus and related cutting devices have been provided which attain the aforenoted objects. Although the structure and operation of the cutting die apparatus has been described in connection with the cutting of window panel from an envelope blank, it is not intended that the invention be limited only to such operations. Various additional modifications of the described embodiments of the invention specifically illustrated and described herein will be apparent to those skilled in the art, particularly in light of the teachings of this invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A rotary holder system capable of carrying a cutting die for cutting a pattern from a material portion, said system comprising:

a cylindrical die holder for rotating on a longitudinal axis, said die holder comprising an outer surface, a plurality of orifices disposed in said die holder outer surface for delivering either vacuum or air to said die holder surface; and a plurality of reference indicators for establishing a coordinate locating system to facilitate placement of said cutting die on said outer surface, said reference indicators comprising marks disposed in a predetermined arrangement on said die holder outer surface;

wherein at least one of said orifices comprises valving means for controlling the flow of air or vacuum thereto.

2. The system of claim 1, wherein said orifices and said references marks are disposed in the same predetermined arrangement as said marks whereby said orifices may be used as a reference mark.

3. The system of claim 1, wherein said valving means comprises a threaded plug.

4. The system of claim 1, wherein said valving means comprises a push plug.

5. The system of claim 3, wherein said threaded plug is comprised of plastic.

6. The system of claim 4, wherein said push plug is comprised of plastic.

7. The system of claim 1, wherein said valving means comprises a screw.

8. The system of claim 1, wherein said reference indicator marks are etched into said die holder outer surface.

9. The system of claim 1, wherein said reference indicator marks are permanently marked on with said die holder outer surface.

10. The system of claim 1, wherein coordinates provided by said reference marks comprise first and second means, respectively, to provide latitude and longitude coordinates for any desired location on said die holder outer surface.

11. The system of claim 10, wherein said first means providing latitude coordinates are disposed parallel to said axis and said second means providing longitude coordinates are disposed perpendicular to said axis.

12. The system of claim 1, wherein said coordinate locating system is utilized with at least one location of said orifice to locate a cutting die plate on said surface at a predetermined location of said surface.

13. The rotary holder system of claim 1, further comprising a plurality of cutting die plate locating means for establishing a predetermined position for a cutting die plate on a face of said cylindrical die holder.

14. A magnetic rotary holder system capable of carrying a cutting die for cutting a pattern from a material portion, said system comprising:

a magnetic cylindrical die holder for rotating on a longitudinal axis, said die holder comprising an outer surface, a plurality of magnetic members disposed in said die holder outer surface for attracting the cutting die, said die holder outer surface having a plurality of orifices, at least one of said orifices being valved independently of the others in the plurality of orifices;

said die holder outer surface further comprising a plurality of die holder surface location reference coordinates;

said cutting die adapted to comprise a flexible magnetically compatible sheet-like material having a second sheet surface adapted to be held against said outer surface of said die holder, and a first sheet surface adapted to be generally parallel to said die holder outer surface and said second surface, said first and second surfaces being defined by at least one of a leading, trailing and opposing edges; and said cutting die first sheet surface further having at least one reference mark for cooperating with said reference coordinates for locating said cutting die plate at a predetermined location on said outer surface of said die holder.

15. The system recited by claim 14, further comprising at least one locator puck resident on said second sheet surface of said cutting die, said at least one locator puck capable of mating with at least one said orifice such that said magnetically compatible cutting die is held by magnetic attraction to said magnetic cylindrical die holder and is at least partially located by a coordinate of said orifice upon said die holder.

16. The system of claim 14, wherein said magnetic die holder further comprises at least one groove for receiving a holding key, said holding key adapted to retain at least one said edge of said magnetically compatible cutting die.

17. The system of claim 16, wherein said magnetic die holder comprises at least two magnetic semi-cylindrical sections with at least one said key disposed therebetween.

18. The system of claim 14, wherein said magnets are substantially rectilinear in shape.

19. The system of claim 18, wherein at least some of said magnetic members are individually interconnected by wire to provide a magnetic flux conductor.

20. The system of claim 16, wherein said locator pucks are substantially cylindrical in shape.

21. The system of claim 16, wherein said locator pucks are substantially spherical in shape.

22. The system of claim 16, wherein said locator pucks are substantially conical in shape.

23. A rotary holder system capable of carrying a cutting die for cutting a pattern from a material portion said assembly comprising:

a cylindrical die holder for rotating on a longitudinal axis, said die holder comprising an outer surface, said die holder outer surface carrying a plurality of individually valved orifices;

said die holder outer surface further comprising a plurality of die holder surface location reference coordinates, said reference coordinates arrayed to be aligned with said orifices;

said cutting die comprising a flexible sheet like material having first and second sheet surfaces defined by at least one of a leading, trailing and opposing edges, and said die holding having a plurality of reference marks for cooperating with said reference coordinates for locating said cutting die plate at a predetermined location on the outer surface of the die holder.

24. The system of claim 18, further comprising a plurality of horizontal grooves formed in said surface for accepting said magnets, wherein said magnets are disposed in said grooves with said orifices between each said magnet.

25. A magnetic rotary holder system adapted to carry a cutting die, said die being adapted to cut a pattern from a material, said magnetic holder system comprising:

a magnetic cylindrical die holder rotatable about an axis, said magnetic die holder having an outer surface and a plurality of orifices disposed on the outer surface wherein the orifices are in communication with a source of vacuum, at a first time, and air, at a second time, at least one of said orifices comprising valving means for selectively controlling the flow of air or vacuum to said orifice;

said magnetic die holder having at least one groove for receiving a holding key to clamp one of said edges of said cutting die; and said holding key comprising an outer surface, a longitudinally directed feed tube, and a plurality of orifices disposed on said key surface and communicating with the feed tube for alternatingly supplying said vacuum and air to the surface of each key.

26. A magnetic rotary holder system adapted to carry a cutting die for cutting a pattern from a material blank, said magnetic holder system comprising:

a magnetic cylindrical die holder rotatable about an axis, said magnetic die holder having an outer surface and a plurality of orifices disposed on the outer surface wherein the orifices are alternatingly in isolation from and in communication with one of a source of vacuum supplied at one axial end of said cylindrical die holder, at a first time, and air supplied at the other axial end of said cylindrical die holder, at a second time, at least one of said orifices comprising valving means for selectively controlling the resective flow of the air or the vacuum to said orifice;

said magnetic die holder having at least one groove for receiving a holding key to clamp one of said edges of said cutting die.

27. The system recited by claim 14, wherein at least one of said orifices is disposed between substantially all adjacent magnetic members in order to maximize the distribution and effect of the orifices thereby permitting the cutting die to be placed anywhere on the die holder.

28. The system of claim 27, wherein said die holder has alternating rows of magnetic members and orifices.

29. The system of claim 28, wherein said die holder further has alternating columns of magnetic members and orifices.

30. A system according to claim 26, wherein said magnetic die holder further includes a plurality of grooves, each said groove receiving a holding key to be fastened therein, at least one of said holding keys being adapted to retain a portion of said magnetically compatible cutting die.

31. The system according to claim 30, wherein said magnetic die holder comprises at least two semi-cylindrical sections in abutting relationship, said semi-cylindrical sections having a groove at their points of abutment at least one key disposed between said sections in said groove.

32. A system according to claim 31, wherein said die holder has a plurality of generally laterally extending grooves and a plurality of generally identical keys are positioned therein, said cutting die adapted to have a leading and a trailing edge, said keys being adaptable to clamp either one of or both of the leading and trailing edges of said cutting die.

33. A system according to claim 30, wherein said key has a generally cylindrically shaped outer surface mating with said die holder outer surface, said key including a vacuum feed tube therein and orifices on said cylindrically shad outer surface, said orifices being connected to said feed tubes.

* * * * *